(12) United States Patent
Biesenbruck et al.

(10) Patent No.: US 10,596,884 B2
(45) Date of Patent: Mar. 24, 2020

(54) TARPAULIN SUSPENSION DEVICE

(71) Applicant: EUROPEAN TRAILER SYSTEMS GMBH, Moers (DE)

(72) Inventors: Volker Biesenbruck, Rees (DE); Frank Frentzen, Viersen (DE)

(73) Assignee: EUROPEAN TRAILER SYSTEMS GMBH, Moers (DE)

( * ) Notice: Subject to any disclaimer, the term of this patent is extended or adjusted under 35 U.S.C. 154(b) by 29 days.

(21) Appl. No.: 15/755,574

(22) PCT Filed: Sep. 1, 2016

(86) PCT No.: PCT/DE2016/100400
§ 371 (c)(1),
(2) Date: Feb. 27, 2018

(87) PCT Pub. No.: WO2017/036463
PCT Pub. Date: Mar. 9, 2017

(65) Prior Publication Data
US 2018/0354350 A1 Dec. 13, 2018

(30) Foreign Application Priority Data
Sep. 1, 2015 (DE) .................... 20 2015 006 044 U

(51) Int. Cl.
*B60J 5/00* (2006.01)
*B60J 5/06* (2006.01)
*E05D 15/06* (2006.01)

(52) U.S. Cl.
CPC ............ *B60J 5/065* (2013.01); *E05D 15/063* (2013.01); *E05Y 2201/692* (2013.01); *E05Y 2900/516* (2013.01)

(58) Field of Classification Search
CPC .. B60J 5/065; E05D 15/063; E05Y 2201/692; E05Y 2900/516
See application file for complete search history.

(56) References Cited

U.S. PATENT DOCUMENTS

2009/0320729 A1* 12/2009 Henry ................. B29C 65/5042
112/313

FOREIGN PATENT DOCUMENTS

| DE | 19855653 A1 * | 6/2000 | .............. B60J 7/062 |
| DE | 202009002621 U1 | 8/2009 | |
| DE | 202012003235 U1 | 8/2013 | |
| DE | 202014000805 U1 * | 2/2014 | .............. B60J 5/065 |
| DE | 202014000805 U1 | 4/2014 | |
| DE | 102013201003 A1 | 8/2014 | |
| DE | 102013201005 A1 | 8/2014 | |
| DE | 102013014629 A1 | 3/2015 | |
| EP | 0882614 B1 | 12/1998 | |

(Continued)

*Primary Examiner* — Lori L Lyjak
(74) *Attorney, Agent, or Firm* — Nath, Goldberg & Meyer; Joshua B. Goldberg; Daniel J. Bissing

(57) ABSTRACT

The invention relates to a tarpaulin suspension device having a base plate (2) on which are provided at least one connecting device (4) for a tarpaulin and at least two support rollers (3) which can be displaced along a longitudinal carrier of a cover frame for a tarpaulin structure. An improved tarpaulin suspension device which can be operated easily and reliably is devised, according to the invention, in that at least one guide roller (8), which is perpendicular to the support rollers (3), is mounted on a narrow side (2S) of the base plate (2).

20 Claims, 15 Drawing Sheets

(56) References Cited

FOREIGN PATENT DOCUMENTS

| | | | |
|---|---|---|---|
| EP | 2371595 | A1 | 10/2011 |
| EP | 2708395 | A1 | 3/2014 |
| EP | 2759428 | A2 | 7/2014 |
| EP | 2759432 | A2 | 7/2014 |
| EP | 2845755 | B1 | 6/2017 |

\* cited by examiner

TARPAULIN SUSPENSION DEVICE

CROSS-REFERENCE TO RELATED APPLICATIONS

This is a National Phase Application filed under 35 U.S.C. 371 as a national stage of PCT/DE2016/100400, filed Sep. 1, 2016, an application claiming the benefit of German Utility Model Application No. 202015006044.7, filed Sep. 1, 2015, the content of each of which is hereby incorporated by reference in its entirety.

BACKGROUND OF INVENTION

(1) Field of the Invention

The invention relates to a tarpaulin suspension device having a base plate on which at least one connection device for a tarpaulin is provided and at least two support rollers are disposed, which rollers can be displaced along a longitudinal carrier of a cover frame for a tarpaulin structure.

(2) Description of Related Art

EP 0 882 614 B1 describes a tarpaulin suspension device having a planar base plate on which two support rollers are mounted perpendicular to the plane of the base plate, which rollers are supported in a longitudinal carrier in which a narrow lower running surface is provided for the circumference of the support roller, wherein the support rollers can be pivoted about an angle on the running surface, which angle is delimited by two restrictions in an upper region of the chamber that accommodates the support rollers. In this regard, the tarpaulin is connected directly with the base plate.

EP 2 371 595 A1 describes a tarpaulin suspension device having a base plate on which two support rollers, each having a plastic raceway, are connected perpendicularly, in which device a guide region of the base plate is bent by approximately 90° above the region of the support rollers and which device has a guide roller that is supported in a separate chamber of the longitudinal carrier. The base plate has an oblong hole essentially parallel with the connection line of the two axes of the support roller, which hole has rounded ends and through which hole a belt that is sewn onto the side tarpaulin can be passed. A region of the base plate having the oblong hole, bordering on the attachment of the support rollers to the base plate, is bent away from the longitudinal carrier. The tarpaulin suspension device allows only slight pivoting of the side tarpaulin, and its production is complicated.

DE 20 2009 002 621 U1 shows a tarpaulin suspension device that has a base plate made of steel, on which two support rollers are mounted perpendicular to the plane of the base plate, which rollers are supported in a longitudinal carrier. The base plate has an oblong hole essentially parallel with the connection line of the two axes of the support roller, which hole has rounded ends and through which hole a belt that is sewn onto the side tarpaulin can be passed. A torque support composed of plastic is clipped into this oblong hole, which support has a contact surface for sliding along the longitudinal carrier. A disadvantage of this tarpaulin suspension device is, for one thing, that undesirable dragging of the base plate on parts of the longitudinal carrier can occur if the tarpaulin initiates a pivoting movement about the contact surface of the support rollers under its own load, and thereby pivots the side tarpaulin, as a whole, toward the utility vehicle structure. The support rollers, which are connected with the base plate by means of riveting, are surrounded by a raceway composed of plastic, which wears away rapidly, wherein replacement of a tarpaulin suspension device in the case of a defective support roller requires time-consuming release of the belt from the tarpaulin. Because of the affixation of the torque support in the oblong hole, in which the belt is also disposed, the belt wears out quickly, and also, unintentional shearing off of the clip connection due to manipulation of the side tarpaulin also comes about.

DE 20 2014 000 805 U1 describes a tarpaulin suspension device in which a base plate comprises a connection device for a tarpaulin and two support rollers. A guide roller is disposed within the connection device for the tarpaulin, which connection device is configured as a perforation, by way of a spring bracket connected with the base plate or a plastic clasp that can be clipped onto the base plate, over the side of the base plate that carries the support rollers in a resilient manner. A disadvantage of the known tarpaulin suspension device, aside from its complicated production is, above all, the circumstance that the base plate is tilted about the guide roller that is disposed approximately centrally, when the side tarpaulin is pulled, thereby causing dragging and working of the base plate into the longitudinal carrier to occur. Furthermore, the freedom of movement for connection of the tarpaulin is quite large.

DE 10 2013 201 003 A1 and DE 10 2013 201 005 A1 describe a tarpaulin suspension device comprising a base plate on which a connection device for a tarpaulin is formed in the shape of an oblong hole, wherein the base plate has two support rollers, the axes of which run normal to the plane of the base plate. In a central portion, part of the base plate is exposed and bent by 90°, wherein a guide roller is provided in a plane below the support rollers, about an axis disposed perpendicular to the exposed part of the base plate. In this regard, the guide roller has a smaller diameter than the two support rollers.

EP 2 708 395 A1 describes a tarpaulin suspension device for a side tarpaulin of a vehicle body, in which the tarpaulin is connected with a guide rod, which in turn is connected with the base plate of the tarpaulin suspension device. Two support rollers are connected transversely to the plate plane, which rollers can be displaced along a longitudinal carrier of a cover frame of the tarpaulin structure. Furthermore, three guide rollers are connected with the base plate, which rollers are disposed perpendicular to the orientation of the support rollers and support themselves on a lateral guide pathway of the longitudinal carrier. In this regard, a first guide roller is connected between the two support rollers, on a folded-down part of the base plate, and is connected perpendicular to the plane of the plate, while the two further guide rollers are connected in a position approximately below the folded-down parts of the base plate. Since both the support rollers and the guide rollers pass through the base plate or its folded-down parts, the resulting tarpaulin suspension device takes up a lot of space and requires a large base plate.

DE 10 2013 014 629 A1 describes a tarpaulin suspension device for a side wall, having a base plate with which a connection device for a tarpaulin and two support rollers are arranged perpendicular to the plane of the base plate. A further plate body is connected with the base plate and has guide rollers inclined at approximately 45° relative to the support rollers of the base plate, which guide rollers have approximately the same dimensions as the support rollers, wherein the plate body surrounds the base plate. The guide rollers are also connected perpendicular to a surface of the plate body that is angled away by 45°. The tarpaulin suspension device, which is composed of base plate and plate body, is quite heavy and takes up a lot of space.

The known tarpaulin suspension devices that have a guide roller are generally based on the principle that the base plate is folded at least once and then the guide roller is mounted in the base plate perpendicular to its folded part. As a result, tarpaulin suspension devices are voluminous and expensive.

BRIEF SUMMARY OF THE INVENTION

It is the object of the invention to indicate an improved tarpaulin suspension device, which can be operated in simple and reliable manner.

This object is achieved by a tarpaulin suspension device having the features of an independent claim.

According to an aspect of the invention, a tarpaulin suspension device has a base plate on which at least one connection device for a tarpaulin and at least two support rollers are disposed, which rollers can be displaced along a longitudinal carrier of a cover frame for a tarpaulin structure. Furthermore, in this regard, at least one guide roller is mounted on a narrow side of the base plate, perpendicular to the support rollers. Mounting on or in the narrow side of the base plate advantageously prevents the base plate from having to be angled away in order to provide a planar section in which the guide roller can be mounted. In this way, it is possible to provide a base plate having an extensively planar progression for a tarpaulin suspension device, which plate can easily be produced by means of punching. While the support rollers are disposed in a plane parallel to the base plate, the at least one guide roller is disposed perpendicular to this, in particular parallel to the narrow side or the edge of the base plate. The tarpaulin suspension device is extremely compact and can therefore easily be stacked or shipped. Furthermore, the base plate can be dimensioned in such a manner that the narrow side is provided at a height that allows the guide roller to roll on the longitudinal carrier.

According to a preferred embodiment, it is provided that the at least one guide roller is mounted on one side in the narrow side of the base plate. For this purpose, a shaft on which the guide roller is mounted, for example, is inserted into the narrow side of the base plate, wherein the corresponding shaft can also project beyond the delimitation of the narrow side and can preferably also be clamped onto or supported on the flat sides of the base plate. Alternatively, the at least one guide roller can also be mounted on both sides, in a narrow side of the base plate, in each instance, so that improved support of the at least one guide roller on the base plate is achieved, but the effort and expenditure for connection of the at least one guide roller to the base plate is increased.

It is expedient if the at least one guide roller is mounted in the narrow side of the base plate that lies opposite the support rollers. In this way, placement of the guide roller in the region of the connection device for a tarpaulin can advantageously be provided, and a comparatively great distance from the support rollers, around the underside of which the tarpaulin suspension device can be pivoted, is hereby achieved. In this way, it is also made possible, in particular, that the support rollers first come into contact with the longitudinal carrier during pivoting of the tarpaulin suspension device toward the longitudinal carrier, and roll along it, so that dragging of the tarpaulin suspension device or of parts of the tarpaulin along the longitudinal carrier is effectively prevented.

It is expedient if the at least one guide roller projects radially on both sides of the base plate. In this way, it is possible to dispose the bearing journal of the guide roller approximately centered in the narrow side of the base plate, and to align the guide roller approximately with the center plane of the narrow side. Alternatively, however, the guide roller can also be mounted eccentrically on the bearing journal, in such a manner that a larger part of the guide roller projects beyond the base plate on the side of the support rollers than on the opposite side.

The at least one guide roller is supported against a guide pathway of the longitudinal carrier, which pathway is configured to be essentially flat. The longitudinal carrier is practically not worn away at all due to the rolling movement of the guide roller about its mounting, so that the distance from the cover frame that is maintained by the tarpaulin suspension device remains almost constant.

Preferably, the at least one guide roller is disposed adjacent to the connection device for the tarpaulin, so that forces introduced into the tarpaulin suspension device and its base plate are absorbed by the guide roller, and the tarpaulin, which is connected in the connection device, is thereby advantageously prevented from rubbing against the longitudinal carrier and thereby being worn or torn. Preferably, in this regard the guide roller is not disposed in the connection device but rather outside of it.

According to a preferred embodiment, it is provided that the at least one guide roller is disposed at the end of the base plate that faces downward. In this regard, the guide roller does not have to be disposed at the lowermost end, but rather it is sufficient that this takes place at a section that faces downward, so that setbacks or gaps in the base plate can also be used for this purpose. For this reason, the base plate preferably has a recess in which the at least one guide roller is disposed, wherein the recess is preferably provided in a corner of the base plate. In this way, access to the narrow side for insertion of a bearing journal is free, to a great extent, and production of the tarpaulin suspension device is comparatively simple.

It is expedient if the at least one guide roller is disposed perpendicular to the plane of the support rollers. However, it is also possible to tilt the at least one guide roller slightly relative to this perpendicular arrangement, or even to configure it resiliently, in order to adapt the tarpaulin suspension device to local conditions.

It is expedient if the at least one guide roller is disposed perpendicular to the plane of the base plate. However, it is also possible to dispose the at least one guide roller slightly inclined relative to this perpendicular arrangement or even completely parallel, if the bearing journal is configured accordingly.

It is expedient if the at least one guide roller is mounted on a bearing journal that is fixed in place on the base plate. In this regard, the bearing journal can be pressed into a groove or into a slot that is worked into the edge or the narrow side of the base plate, but alternatively it can also be welded to the base plate. It is also possible to drill a hole into the narrow side of the base plate, into which a cylindrical projection of the bearing journal is pressed. Alternatively, a securing bolt can also be driven through the bearing journal, connecting it with the base plate or fixing it in place on the base plate, instead of pressing something in. Furthermore, it is possible that the bearing journal is part of the base plate, in other words is configured in one piece with the base plate. Thus, the bearing journal can be configured as a projecting section of the edge of the base plate, for example, which can subsequently be rounded off in terms of circumference. The journal can still be aligned, for example bent before or after rounding. Welding of the bearing journal to the base plate shows the advantage that the bearing journal becomes one piece with the base plate, and, in particular, a washer or the like for the actual guide roller, which can also project beyond the narrow side of the base plate, is connected with the base plate.

It is expedient if the rotating part of the guide roller is structured as a perforated disk made of plastic, mounted on the bearing journal, similar to a ring composed of solid material, which disk is secured by means of a split ring or splint, for example. A separate bearing bushing is not absolutely necessary with this material pairing.

According to a particularly preferred feature of the invention, it is provided that two guide rollers are disposed on the base plate, wherein each half of the base plate has its own guide roller associated with it. In this way, the result is advantageously achieved that each of the two guide rollers supports the base plate and thereby the tarpaulin suspension device against the longitudinal carrier, so that when the tarpaulin is pulled, pivoting of the base plate about one of the two guide rollers practically does not occur, since both guide rollers roll on the longitudinal carrier. For this purpose, it is expedient if the two guide rollers are disposed as far outward as possible with reference to the displacement direction of the tarpaulin suspension device, in order to allow only a slight tilting moment. It is possible to provide more than precisely two guide rollers, for example three or four. It is expedient if the guide rollers are disposed close to the face sides of the base plate, which face in the movement direction, so that even in the case of tilting of the base plate or lifting of the support rollers out of the related pathway of the longitudinal carrier, the guide rollers are first to come into contact with the longitudinal carrier.

It is expedient if the two guide rollers are disposed symmetrically on the base plate with reference to a plane that cuts the base plate in half between the two support rollers, so that the behavior of the tarpaulin suspension device is approximately the same during opening and closing. Alternatively, it is possible to dispose more than two guide rollers on the base plate, for example if further guidance functions are desired.

It is expedient if the mounting of the two guide rollers, in other words the location at which the bearing journal is connected, is disposed in a region of the base plate, in each instance, which lies outside the region that circumscribes the support rollers. In this way, the result is achieved that even if the tarpaulin suspension device as a whole is subjected to an asymmetrical load, at least one of the two guide rollers is in contact with the longitudinal carrier or is first to make contact.

According to a preferred embodiment, it is provided that the circumference of the guide rollers is set back slightly relative to the face sides of the base plate, which faces in the displacement direction of the tarpaulin suspension device. In this way, the rollers of adjacent tarpaulin suspension devices are prevented from touching at the face sides when a tarpaulin is pushed together, and possibly blocking one another. In particular, in this way the guide rollers or their mountings are prevented from being damaged in the event that the side tarpaulins are pulled open suddenly.

Preferably, the distance of the support rollers from the base plate is greater than the radius of the guide rollers. In this way, the result is achieved that the support rollers can be inserted into a corresponding contact region of the longitudinal carrier, and the guide rollers can support themselves against a surface of the longitudinal carrier that faces outward, without the base plate tilting when this happens. Instead, the base plate is held essentially vertically, and advantageously centered from the contact line of the support rollers with the contact region and the contact line of the guide rollers with the wall that faces outward. In particular, the tarpaulin suspension device can be pivoted about the line that is formed by the underside of the support rollers and the contact region, thereby making it possible for the guide rollers to come out of engagement with the wall of the longitudinal carrier, for example when the tarpaulin is activated.

According to an embodiment, it is provided that the support rollers have a raceway having a circumference surface composed of steel for support on a longitudinal carrier. Preferably, however, the raceway is configured as an applied plastic raceway, thereby causing the longitudinal carrier to practically not be worn away at all during displacement of the tarpaulin and the tarpaulin suspension device.

Preferably, the raceway is connected to an outer bearing ring of a roller bearing, particularly of a ball bearing. Alternatively, however, the raceway can also be configured as an outer bearing ring of the roller bearing, thereby eliminating the work of joining the outer bearing ring and the raceway together.

Preferably, the circumference surface of the raceway has a radial delimitation that is semicircular in cross-section, and the radius of which is selected to be correspondingly small, in other words about half the thickness of the support roller. Alternatively, however, the circumference surface of the raceway can also have a radial delimitation that is semicircular in cross-section, has a large radius, and is rounded off at the corners, thereby causing the support roller to have a very flat curvature in the region of its vertex, thereby reducing the tendency to dig into the running surface of the longitudinal carrier.

Preferably, the support rollers are connected with the base plate by way of a roller bearing, in particular a ball bearing, with an inner bearing ring and an outer bearing ring, wherein the inner bearing ring has a hollow-cylindrical section that projects axially beyond the outer bearing ring, which section forms a spacer from the base plate. In this way, the roller bearing can be connected directly with the base plate, in advantageous manner, so that the connection of the support roller with the base plate is simplified, and unnecessary mobility in the module is prevented.

Preferably, the hollow-cylindrical section has a face side that is supported on a side of the base plate that faces the longitudinal carrier. In this way, placement of the support rollers parallel to the plane of the region of the base plate against which the face side is laid can be achieved if the inner bearing ring has a face side parallel to the plane of the support rollers. However, it is also possible that the face side is slanted away relative to the plane of the support roller, thereby making it possible to achieve placement of the support rollers at an incline relative to the base plate.

It is possible that the hollow-cylindrical section has a central threaded section, which can be connected with a screw bolt. In this way, a connection that is easy to release again but nevertheless is not subject to much movement is created. Defective support rollers can thereby easily be replaced.

According to an embodiment, the inside diameter of the hollow-cylindrical section coincides with the diameter of a round bore in the base plate, to which the hollow-cylindrical section is connected, so that the two parts, the hollow-cylindrical section and the bore, can have a shaft part of the screw bolt, having the same outside diameter, passing through them. Preferably, however, the bore in the base plate is structured to be prismatic, particularly square, and the shaft section of the screw or of the screw bolt that passes through the bore is structured to be complementary, in other words also prismatic, particularly square. In this way, the result is advantageously achieved that the screw bolt does not have to be held with a tool to prevent it from rotating during assembly. The cylindrical threaded section of the screw bolt then follows the prismatic section. Then, only a single tool is required, which engages into a lug in the side of the inner bearing ring that faces away from the base plate. The lug can be configured as a torx, hexagon, Phillips head or flat head, or the like.

Preferably, it is provided that the support rollers are connected with the base plate by way of a screw bolt, in each instance, and that the screw bolt comprises a head and a shaft provided with an outside thread, which shaft can be screwed into the inside thread or the inner threaded section of the spacer section. In this way, the inner bearing ring of the support roller is axially secured with reference to the base plate, in simple manner. In this way, a replaceable connection of the support roller with the base plate is advantageously made possible, thereby creating replacement of a defective tarpaulin suspension device, which until now required releasing the belt from the tarpaulin, in simple and surprising manner, in that the screw connection for the support roller is released and a functioning support roller is connected with the base plate once again. In this way it is possible, in particular, to quickly repair a defective tarpaulin suspension device, in that a defective support roller is replaced by a functioning support roller. For this purpose, it is expedient if engagement regions for a tool are provided not only on the inner bearing ring but also on the screw, in order to be able to screw them apart in opposite directions.

Preferably, the inner bearing ring of the support roller has an axial extension that is at least twice as large as the outer bearing ring in the support roller, so that the inner bearing ring can be used as a spacer at the same time. Alternatively, a separate spacer sleeve can be provided between the bearing ring and the base plate, wherein the screw shaft then is supposed to reach all the way to the inner bearing ring, in order to fix it in place to prevent rotation.

It is expedient if the raceway and an outer bearing ring of the support roller have essentially the same thickness, so that no tilting and no collection of contaminants occur at this location.

The base plate preferably consists of steel and is preferably configured as a planar part that can be punched out of a metal sheet, wherein folded-down and/or bent-away regions can easily be produced subsequently. It is possible to also bend the base plate away along a horizontal line, so that an upper, planar section and a lower, also planar section that stands at an angle to the upper section are formed. The bending line preferably runs close to the horizontal center line of the connection device, which is configured as an oblong hole.

The tarpaulin suspension device can be used in particularly expedient manner for displaceable and pivotable suspension of a side tarpaulin of a utility vehicle structure.

The tarpaulin suspension device can furthermore be used in particularly expedient manner for pivotable suspension of a side tarpaulin of a tarpaulin structure, for example of a utility vehicle.

According to one aspect of the invention, a side tarpaulin of a utility vehicle structure is created, which structure is characterized by at least one belt, which is passed through a perforation of a tarpaulin suspension device that forms a connection device for the tarpaulin, as was explained above, and with which the tarpaulin material is connected.

According to an aspect of the invention, a tarpaulin structure having a cover frame is created, which has an upper longitudinal carrier, to which at least one tarpaulin suspension device can be attached. The tarpaulin suspension device comprises a base plate, on which at least one connection device for a tarpaulin and at least two support rollers are arranged, which can be displaced along a longitudinal carrier of the cover frame. The tarpaulin suspension device has at least one guide roller oriented transversely relative to the support rollers, preferably perpendicular, which roller is disposed or mounted on a narrow side of the base plate. By means of the placement of the guide roller in the narrow side or in the edge of the base plate, a compact and inexpensive but nevertheless stable support against the longitudinal carrier is made possible, which has little play and requires little construction space. In particular, it is not necessary to bend the region of the base plate on which the guide rollers are mounted, relative to an other region of the base plate.

The base plate is configured as a plate body and thereby, in its simplest, almost two-dimensional configuration, has two planar sides or surfaces, the distance between which defines the thickness of the plate. In this configuration of the base plate, the narrow side comprises the edge of the base plate having the aforementioned thickness, but not the two planar sides. Furthermore, the narrow side also comprises the edges of the parts of the base plate cut out of the base plate. In the case of bent base plates or bent parts of base plates, the corresponding sides or surfaces, on the one hand, and edges, on the other hand, are present once again. The tarpaulin suspension device is characterized in that at least one roller, generally a guide roller, is mounted not perpendicular to the side or surface, but rather perpendicular to the narrow side or the edge, and thereby to the plate plane. In this way, the correspondingly mounted roller can rotate in a plane perpendicular to the plate plane. It should therefore be understood that the narrow side is not larger than the thickness of the plate body.

Further advantages, characteristics, properties, and embodiments of the invention will arise from the description of preferred exemplary embodiments, and from the dependent claims.

BRIEF DESCRIPTION OF THE SEVERAL VIEWS OF THE DRAWINGS

The invention will be explained in greater detail below, making reference to the attached drawing, using preferred exemplary embodiments.

DETAILED DESCRIPTION OF THE INVENTION

Figure 1:
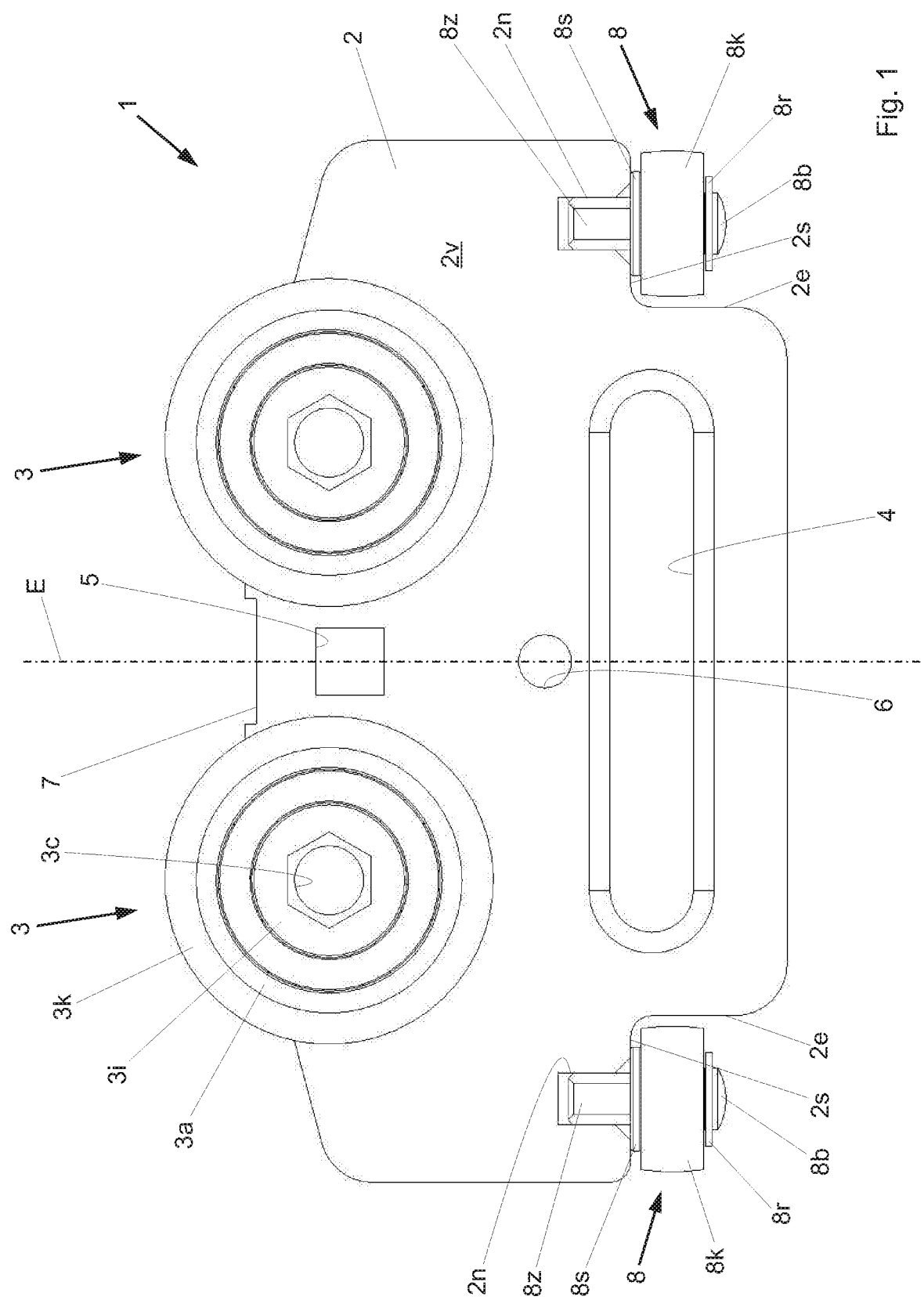
FIG. 1 shows a top view of a preferred exemplary embodiment of a tarpaulin suspension device according to the invention from the front.
Figure 2:
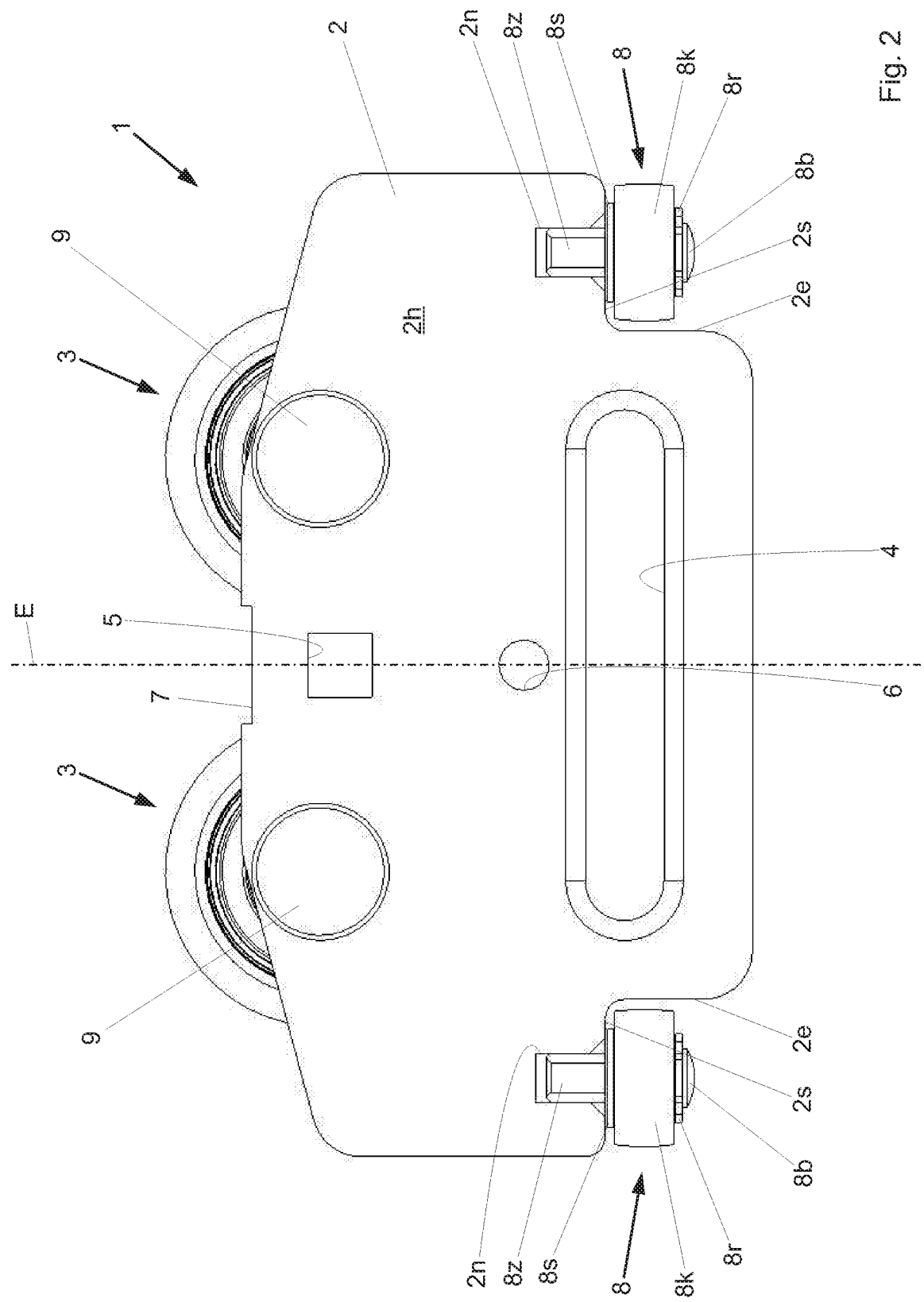
FIG. 2 shows a top view of the tarpaulin suspension device from FIG. 1 from the rear.
Figure 3:
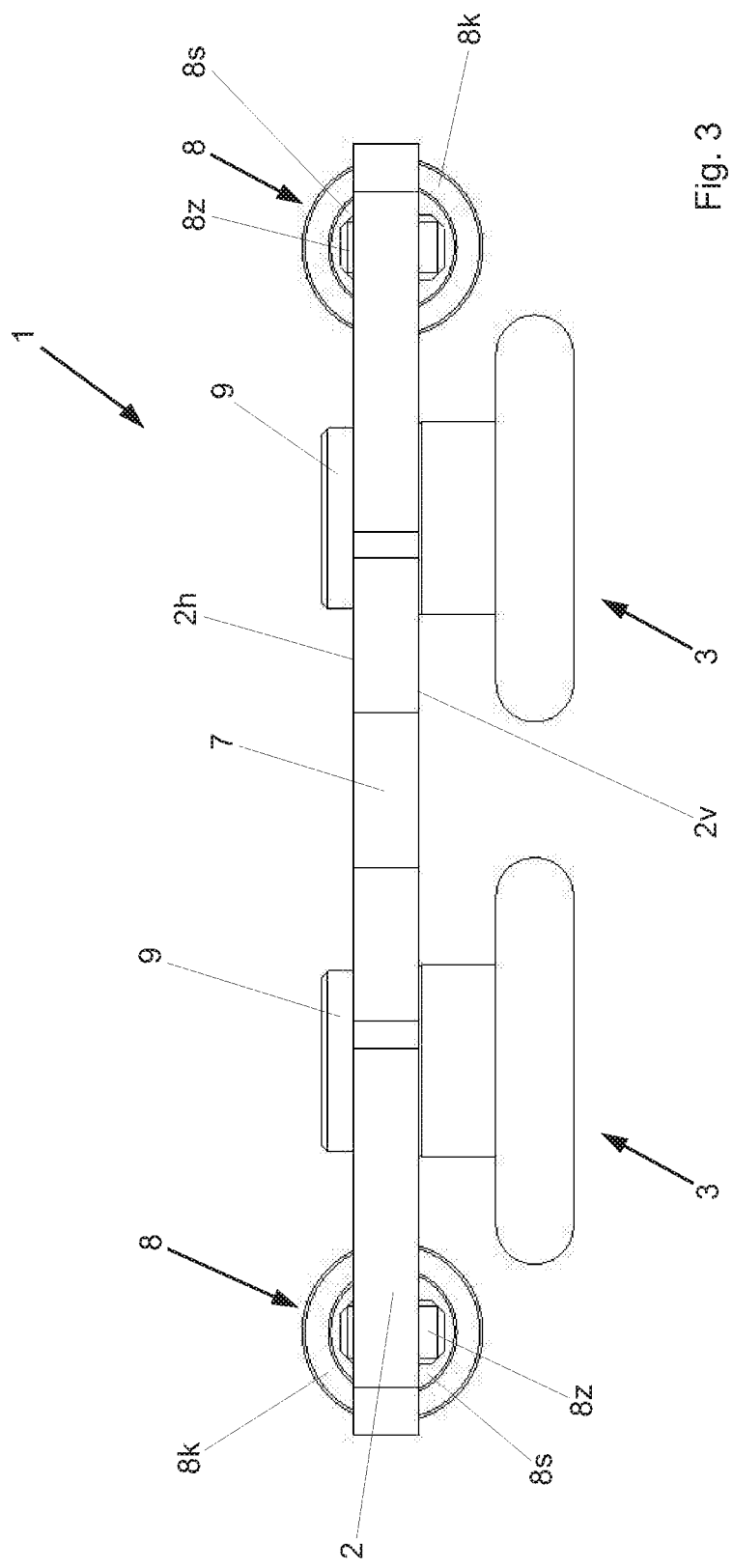
FIG. 3 shows a top view of the tarpaulin suspension device from FIGS. 1 and 2 from above.
Figure 4:
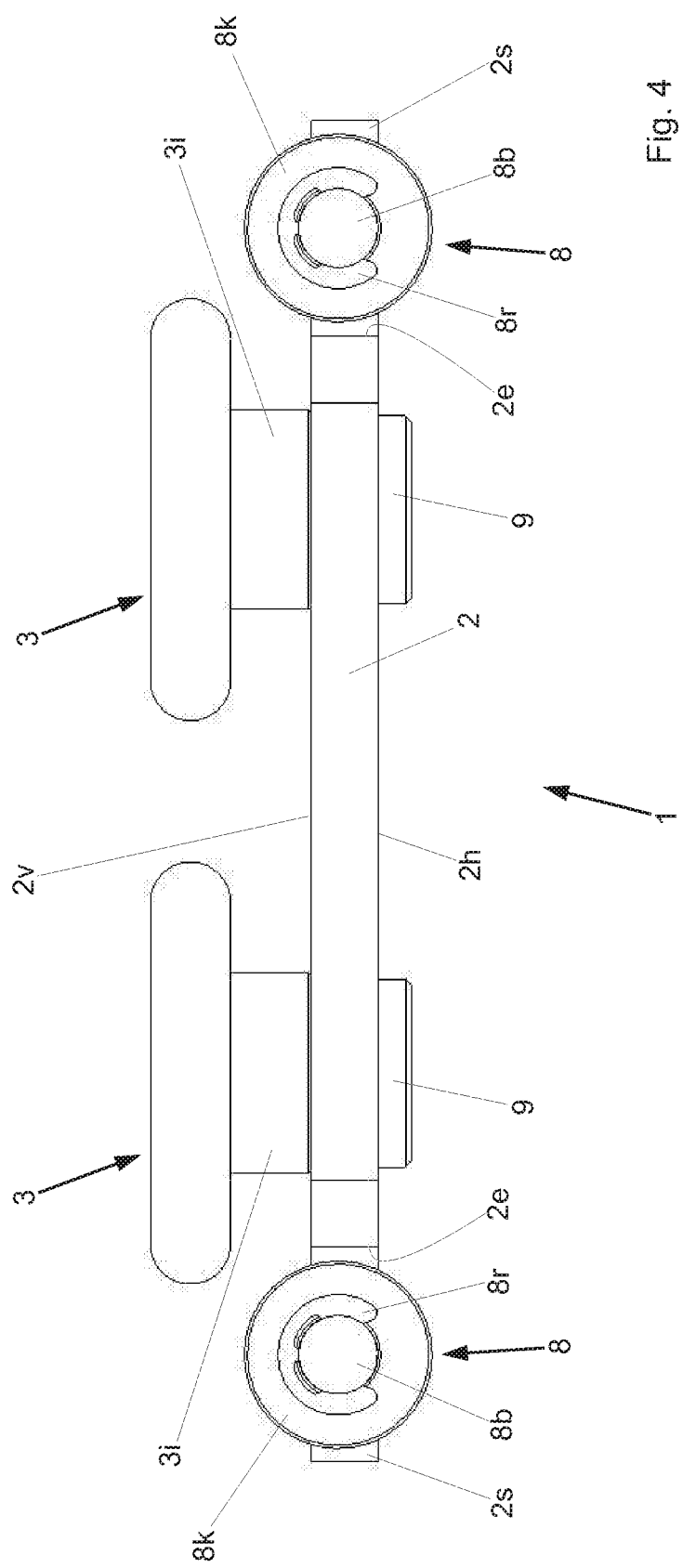
FIG. 4 shows a top view of the tarpaulin suspension device from FIGS. 1 to 3 from below.
Figure 5:
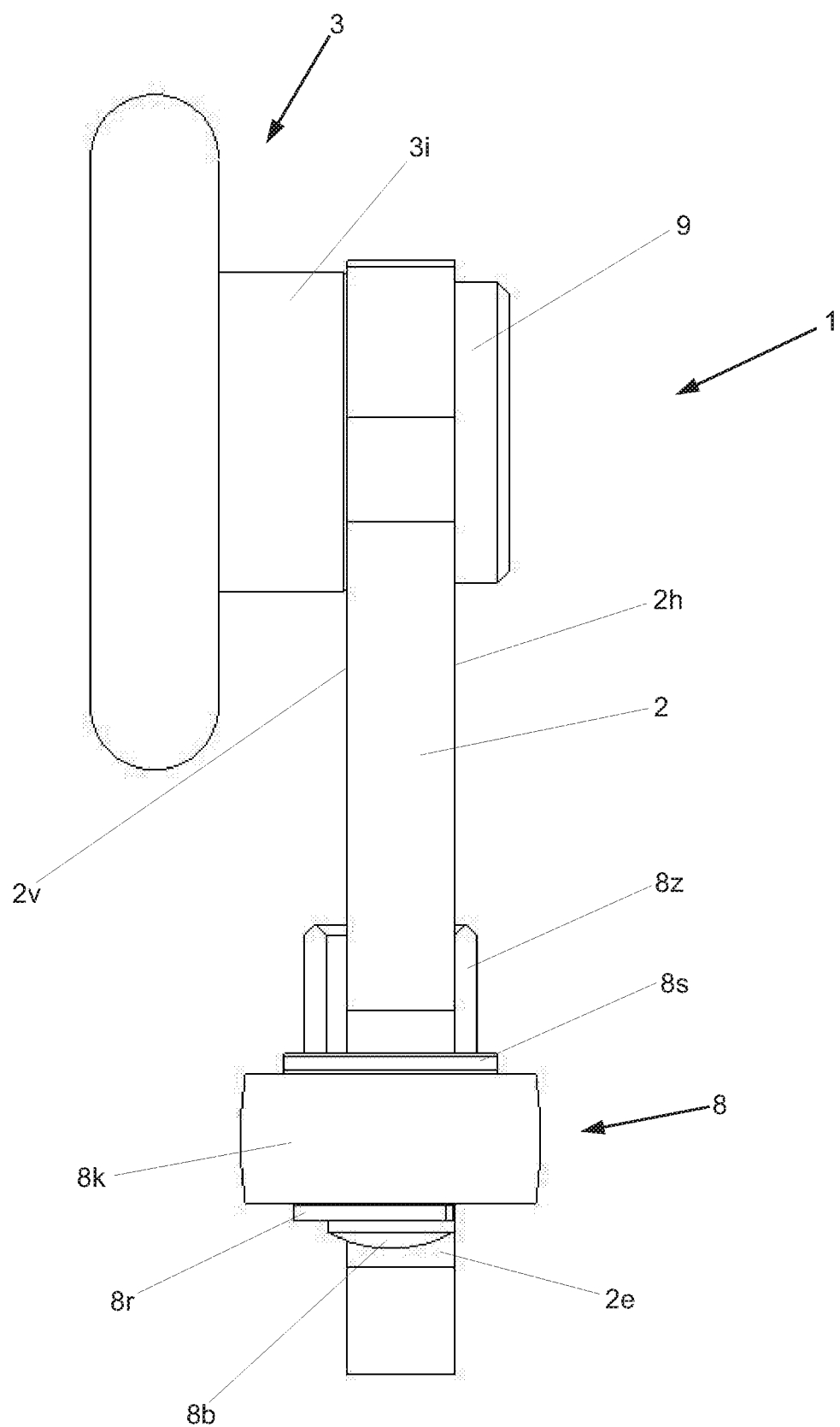
FIG. 5 shows a top view of the tarpaulin suspension device from FIGS. 1 to 4 from a side.
Figure 6:
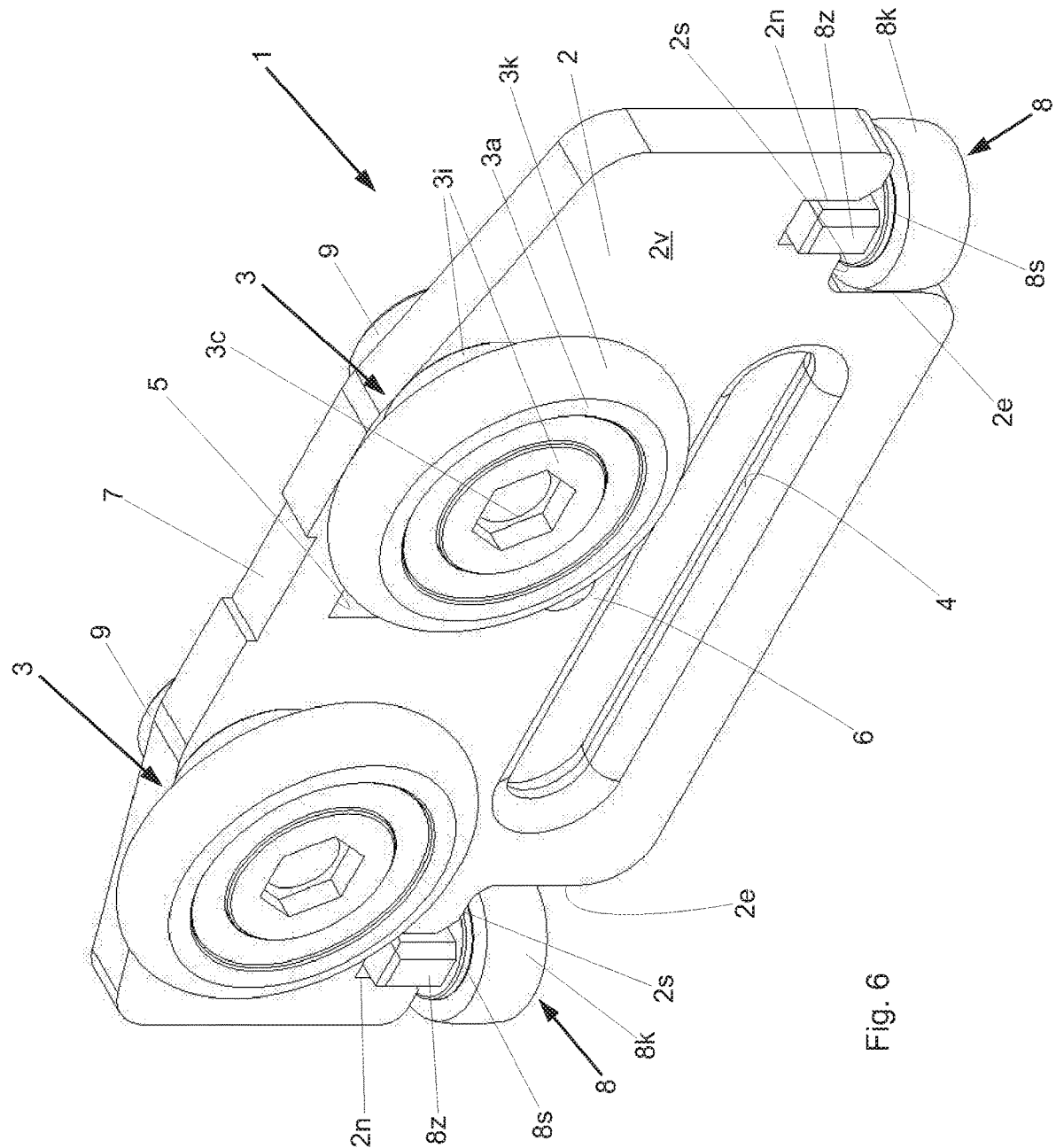
FIG. 6 shows a perspective view of the tarpaulin suspension device according to FIGS. 1 to 5 from the front.

FIGS. 1 to 6 show a preferred exemplary embodiment of a tarpaulin suspension device 1, in which a flat or planar base plate 2, punched out of a steel sheet, carries two support rollers 3, which are intended for being displaced horizontally in a corresponding running pathway of a longitudinal carrier L, in the plane of the two support rollers 3. Furthermore, a connection device for a tarpaulin P, configured as an oblong hole 4, is provided in the base plate, the two ends of which are rounded off and which furthermore has edges rounded off toward the inside, between a front side 2v and a rear side 2h of the base plate 2. A belt can be passed through the oblong hole 4, which belt is sewn onto the tarpaulin P, configured as a side tarpaulin, so that the tarpaulin suspension device 1 as a whole suspends the tarpaulin P on the longitudinal carrier L. In general, a plurality of tarpaulin suspension devices 1 are connected with the tarpaulin P and suspended into the longitudinal carrier for this purpose. Alternatively to a belt, a different suspension element is also possible, for example if a rigid part similar to a stake is disposed in the tarpaulin.

It can be seen that furthermore, a square perforation 5 and a round perforation 6 are formed in the base plate, which lie on a plane E that cuts the base plate 2 in half, into a left half and a right half (FIG. 1). The tarpaulin suspension device 1 is structured with mirror symmetry relative to this plane E.

Furthermore, it can be seen that with the exception of a sharp-edged upper depression 7, the edge of the base plate 2 is structured with radii at the corners and has a sufficient material distance from the edge with respect to all the perforations 4, 5, 6 so that weak points are prevented.

The base plate 2 can be approximately circumscribed by a rectangle that lies on its long side, wherein an approximately square field 2e is left out in the two lower corners. At the downward-facing edge or the downward-facing narrow side 2s of the base plate 2, a guide roller 8 is mounted, in each instance, which rollers both support themselves against an outward-facing guide pathway of the longitudinal carrier L. The two guide rollers 8 lie in a common horizontal plane, which lies at a right angle to the vertical plane in which the support rollers 3 lie.

In order to connect the two guide rollers 8 with the base plate, a groove 2n that passes through the thickness of the base plate 2 is formed in the base plate 2, which groove cuts into the lower narrow side 2s. In this regard, the region of the groove 2n that lies adjacent to the lower narrow side 2s has an introduction bevel formed in the manner of a chamfer, in order to facilitate insertion of a bearing journal 8z of the guide roller 8. The bearing journal 8z is pressed into or welded into the groove 2n of the base plate 2, wherein in the case of it being pressed in, further securing can be provided by means of welding. It can be seen that the thickness of the journal 8z is greater than the thickness of the base plate 2, so that the journal 8z projects beyond the base plate both on the front side 2v and on the rear side 2h. In this regard, the bearing journal 8z projects somewhat further on the front side than on the rear side 2h. The width of the bearing journal 8z is adapted to the width of the groove 2n, so that the bearing journal 8z is accommodated in the groove 2n without play, possibly even in wedged manner. The bearing journal 8z is produced from steel, so that good weldability with the material of the base plate 2n exists. It is possible that the regions of the bearing journal 8z that project out of the groove 2n project laterally beyond the front side 2v and/or the rear side 2h of the base plate 2 and thereby achieve additional wedging in the manner of a flange or T piece at the two planar sides of the base plate 2. It is furthermore possible to provide undercuts or the like in the groove 2n, into which projections of the bearing journal 8z can penetrate after it has been pressed in, with the result that assembly is particularly easy and the tolerances that possibly occur during welding or during pressing in can be avoided.

It can be seen that a disk 8s configured in the manner of a washer, forming a collar, and made of the same material as the bearing journal 8z is provided, from the center point of which disk a bolt-like cylindrical section 8b of the bearing journal 8z projects axially, which section holds and supports a perforated disk 8k of the guide roller, which disk has a central bore. The perforated disk 8k of the guide roller 8 is then fixed in place on the cylindrical bearing bolt 8b or a circumferential groove formed on it, using a split ring 8r, and secured to prevent movement along the bolt 8b. It can be seen that it is possible to displace the bearing journal 8z with reference to the base plate 2, in the direction of the groove 2n, in such a manner that the guide roller 8, i.e. its rotating part, the perforated disk 8k, has precisely the desired distance from the guide surface of the longitudinal carrier L.

It is understood that instead of the comparatively simple mounting of the guide roller 8 on the bolt 8b, a ball bearing can also be provided, in which the inner mounting part would possibly be structured in one piece with the journal 8z, so that the outer mounting part, for example composed of metal, would account for the rolling part of the roller 8. It can be seen that the guide rollers 8 have practically no tolerance with regard to the base plate 2 due to the rigid affixation of the bearing journal 8z to the base plate 2, so that there is no risk that the guide rollers 8 move back as the result of introduction of a force into the tarpaulin suspension device 1, for example by pulling on the tarpaulin P, causing the base plate 2 to work into the longitudinal carrier L. It can furthermore be seen that replacing the plastic part 8k of the roller 8 is easy, by removing the split ring 8r, so that in case of wear, the wear part 8k can be replaced and then be affixed to the cylindrical bolt 8b of the bearing journal 8z of the roller 8 once again, using the split ring 8r.

Figure 7:
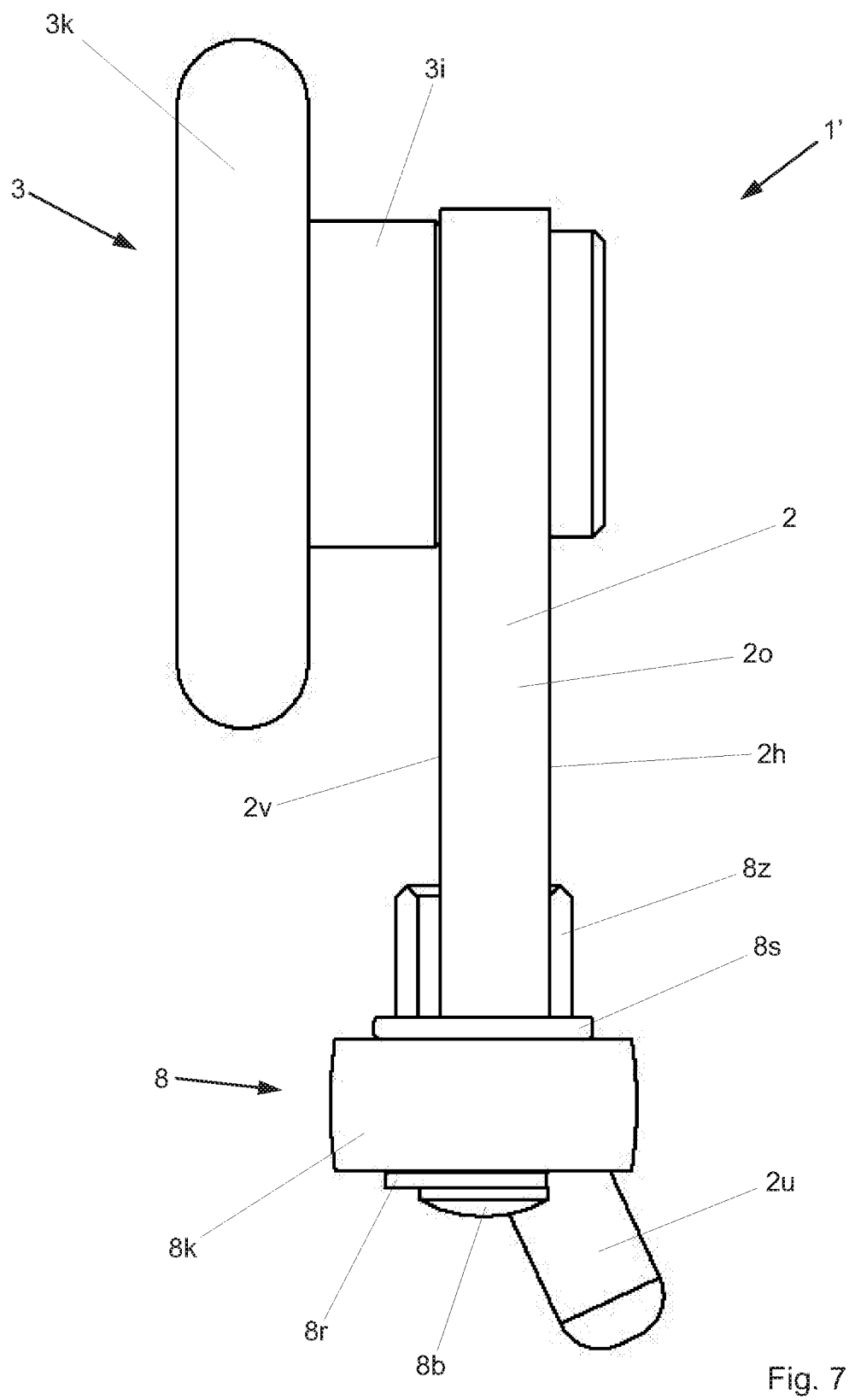
FIG. 7 shows a top view of a different preferred exemplary embodiment of a tarpaulin suspension device according to the invention from a side corresponding to FIG. 5.

In FIG. 7, a modified embodiment of a preferred tarpaulin suspension device 1' is shown, wherein the same reference symbols refer to the same or structurally comparable parts as in the embodiment according to FIGS. 1 to 6. In contrast to the tarpaulin suspension device 1, the tarpaulin suspension device 1' is bent to the rear by an angle of approximately 25° approximately in the horizontal plane that divides the oblong hole 4 into two vertical halves, so that the lower edge of the oblong hole 4 no longer aligns with the upper section 2o of the base plate 2. As a result, the lower section 2u of the base plate 2 is angled away relative to the upper section 2o of the base plate 2. In this way, the result is advantageously achieved that the belt passed through the oblong hole 4 and the tarpaulin P that hangs on it bring about a moment on the base plate 2 about the plane in which the underside of the support rollers 3 lie on the corresponding pathway of the longitudinal carrier L, with the result that the guide rollers are pressed against the guide surface of the longitudinal carrier L with this moment. It can be seen that the region with which the guide rollers 8 are connected still belongs to the upper section 2o of the base plate, so that the lower narrow side 2s of the base plate 2 further allows perpendicular placement of the guide roller 8 relative to the support roller 3. However, it is possible, if the base plate is supposed to be folded in a higher region, to insert the bearing journal 8z into the groove 2n in such a manner, at an angle, that the guide roller 8 continues to lie in a horizontal plane. Likewise, it is possible to configure the plastic part 8k of the guide roller 8 conically, in order to balance out the angle.

Figure 9:
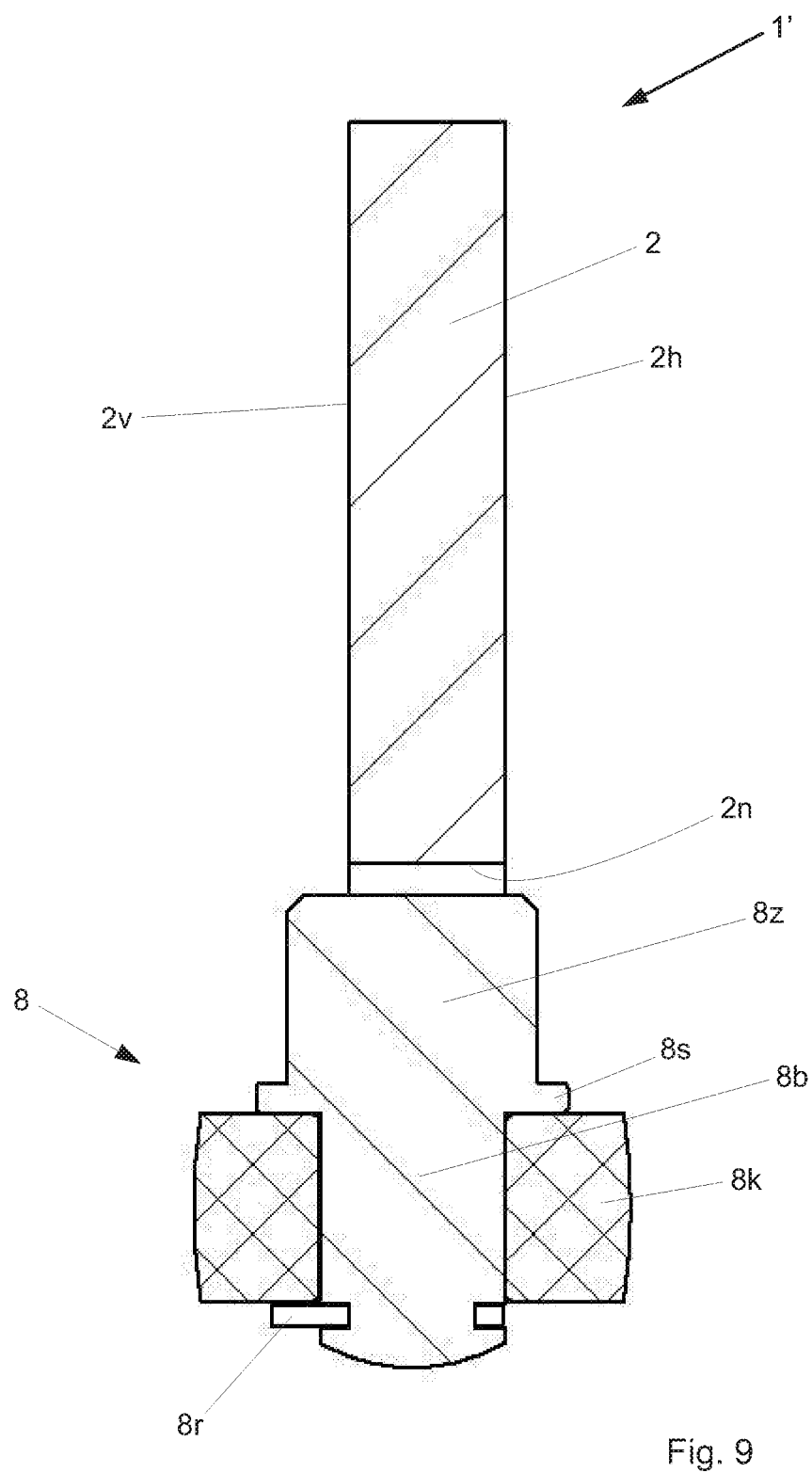
FIG. 9 shows a vertical section through the tarpaulin suspension device from FIG. 7 through a guide roller.

In FIG. 9, a vertical cross-section through the roller 8 and the related part of the base plate 2 is shown (the same construction for both exemplary embodiments), in which it can be seen that the bearing journal 8z, the disk 8s, and the bolt 8b are structured as a one-piece part, and that the bearing journal 8z does not completely reach the bottom of the groove 2n. It can be seen that the center of the bolt 8b is offset slightly in the direction toward the front side 2v of the base plate 2, as compared with the center plane of the base plate 2, and that the diameter of the plastic part 8k amounts to more than twice the diameter of the cylindrical bolt 8b. Furthermore, it can be seen that no further parts are required for the guide roller 8.

Figure 8:
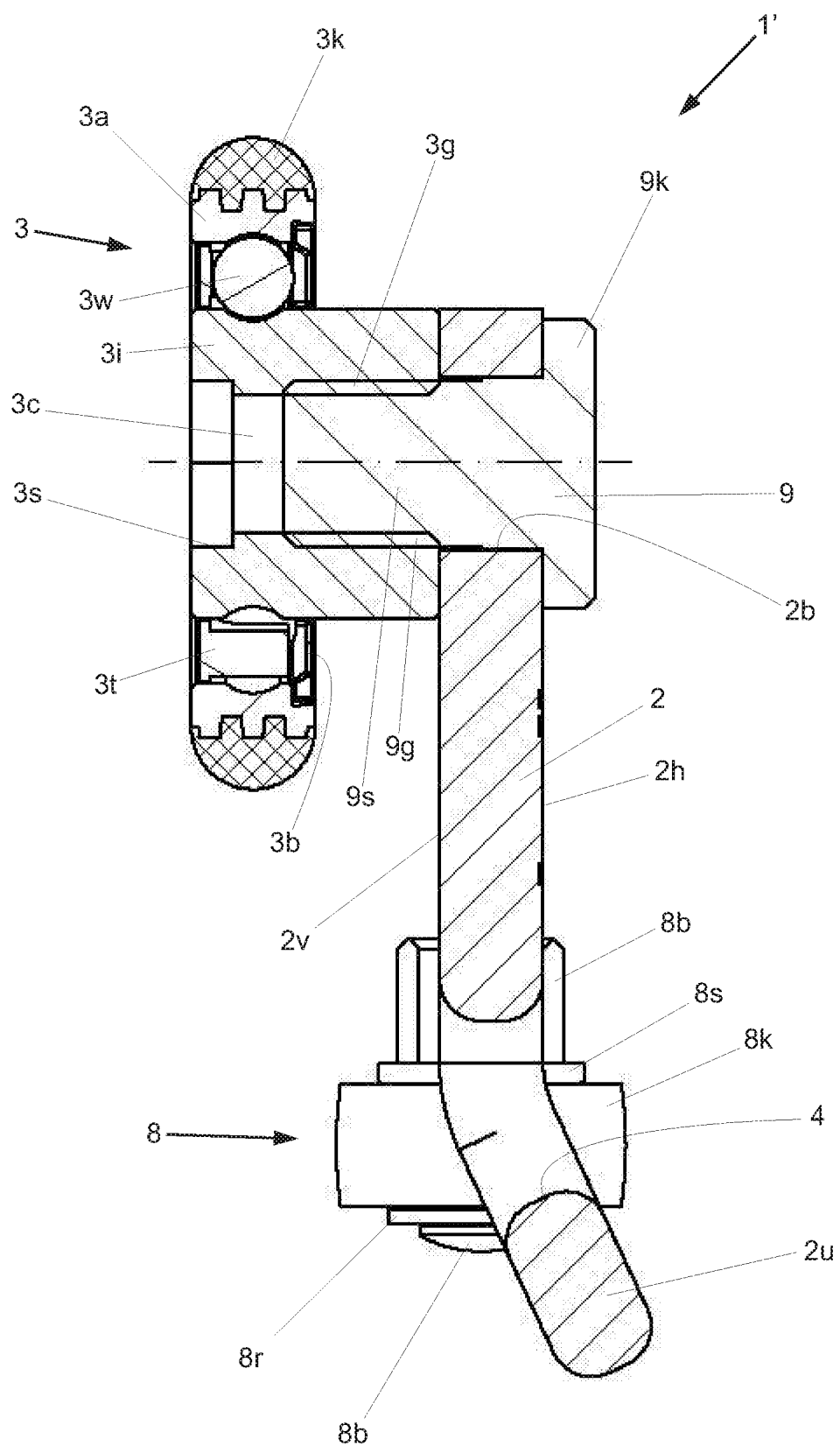
FIG. 8 shows a vertical section through the tarpaulin suspension device from FIG. 7 through a support roller.

FIG. 8 shows a vertical cross-section through the tarpaulin suspension device 1', which passes through the center point of one of the support rollers 3. Here, too, it can be seen that the guide roller 8 remains in the horizontal plane, while the lower section 2u of the base plate 2, including the lower part of the oblong hole 4, is bent away toward the rear.

Furthermore, it can be seen that the support roller 3 is screwed onto the base plate 2 (in the same manner in both exemplary embodiments). For this purpose, a screw 9 having a head 9k and a screw shaft 9s is provided, which has an outside thread 9g, wherein the shaft-side flange of the head 9k lies against the rear side 2h of the base plate 2. The shaft 9s is adapted to the diameter of a bore 2b of the base plate, and is thereby held on the base plate 2 free of play. The bore 2b is configured as a square hole in the present case (not shown), while the section of the shaft 9s that passes through the square hole is structured as a complementary square profile, so that the two parts, which engage into one another, form an anti-rotation device.

The guide roller 3 comprises an inner ring 3i and an outer ring 3a, on which a rounded-off plastic profile 3k is applied. The rounded-off profile can, however, also be made of metal, if better running properties with the material of the longitudinal carrier L, which generally consists of aluminum, occur as a result. A ring composed of rolling bodies 3w configured as balls allows relative rotation of the outer ring 3a relative to the inner ring 3i, wherein corresponding spherical circumferential grooves are provided in the outer ring 3a and inner ring 3i for this purpose. The rolling bodies 3w are separated from one another by a roller body support ring 3t, which simultaneously covers the frontward-facing face side between outer ring 3a and inner ring 3i. On the opposite side, a shutter 3b is provided, which prevents penetration of contaminants and the like. It can be seen that the inner ring 3i is more than twice as wide as the outer ring 3a, and is elongated in the manner of a sleeve and has a central bore 3c. The central bore is equipped with an inside thread 3g, at least in certain sections, into which the outside thread 9g of the screw bolt 9 can be screwed.

A hexagon 3s is formed on the frontward-facing side of the central bore 3c of the inner ring 3i, which hexagon serves as a lug or receiving part for a tool. Likewise, if necessary, a further hexagon or slot is formed on the rearward-facing region of the screw bolt 9, which also serves as a receiving part for a tool, if bore 2b and the section of the shaft 9s that passes through it are not structured as a complementary square profile. In this way, the support roller 3 can be connected with the base plate 2 in simple manner, and furthermore, in the case of a defect or wear, can also easily be replaced. It is even possible to replace the support roller 3, just like the guide roller 8, without having to release the tarpaulin suspension device 1, 1' from the belt or from the tarpaulin P for this purpose. In this regard, the head 9k and the inner ring 3i have a diameter that allows covering the surface of the bore 2b configured as a square hole, so that water or contaminants cannot penetrate.

Figure 10:
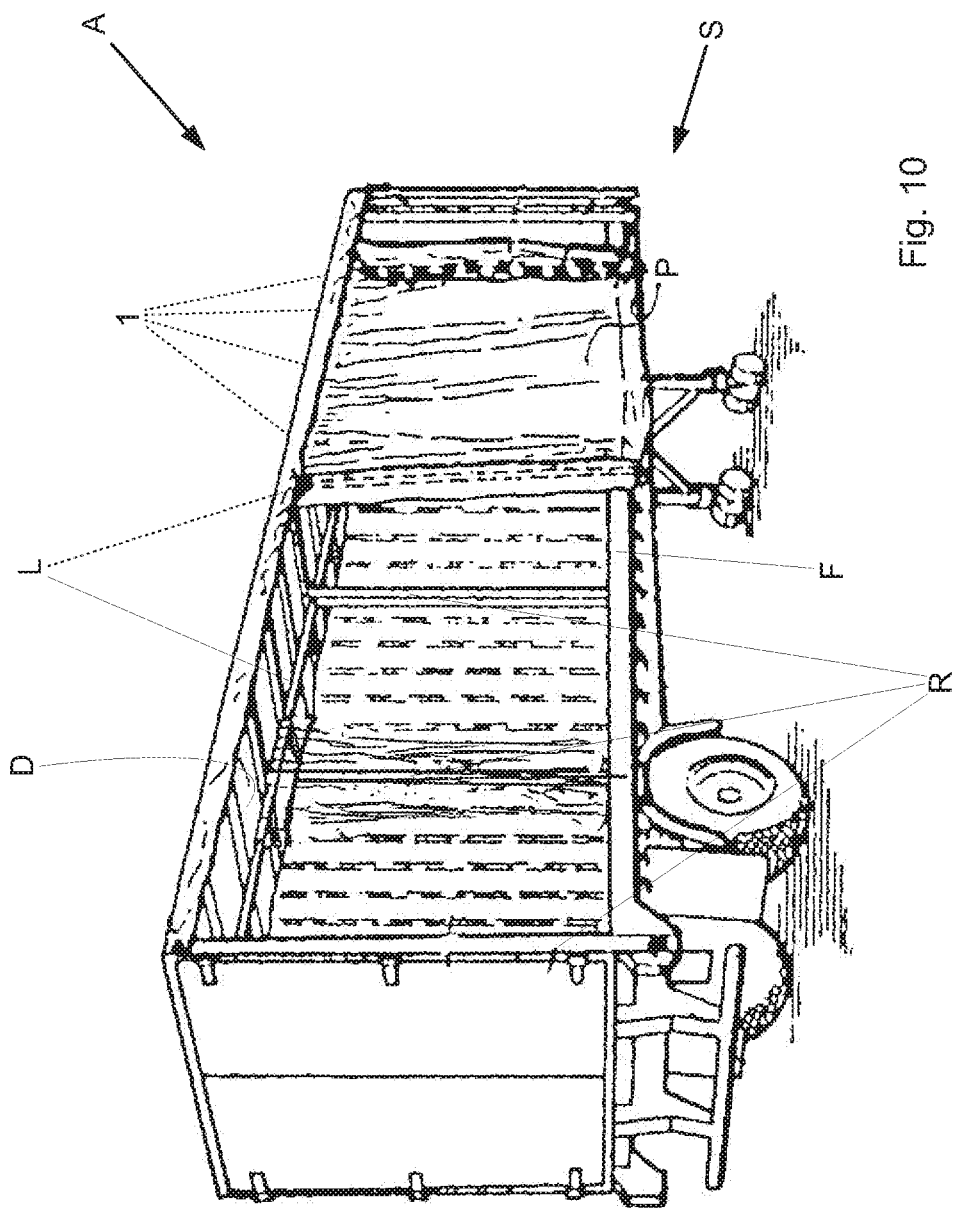
FIG. 10 shows a perspective view of a tarpaulin structure that covers a semi trailer, having tarpaulin suspension devices according to FIGS. 1 to 6.

FIG. 10 shows a view of a tarpaulin structure A that is built over a loading surface F of a semi trailer S. The tarpaulin structure A contains longitudinal carriers L supported relative to the loading surface F by way of stakes R, with which carriers a sliding roof D is connected. The side tarpaulin P is connected with a chamber K of the longitudinal carrier L by way of tarpaulin suspension devices 1 (FIG. 11), which are covered by part of the roof tarpaulin in FIG. 10 and therefore cannot be seen; this chamber permits tilting about the contact point of the support rollers 3 on the bottom of the chamber K, in such a manner that the lower end of the tarpaulin suspension devices 1 is pivoted outward.

Figure 11:
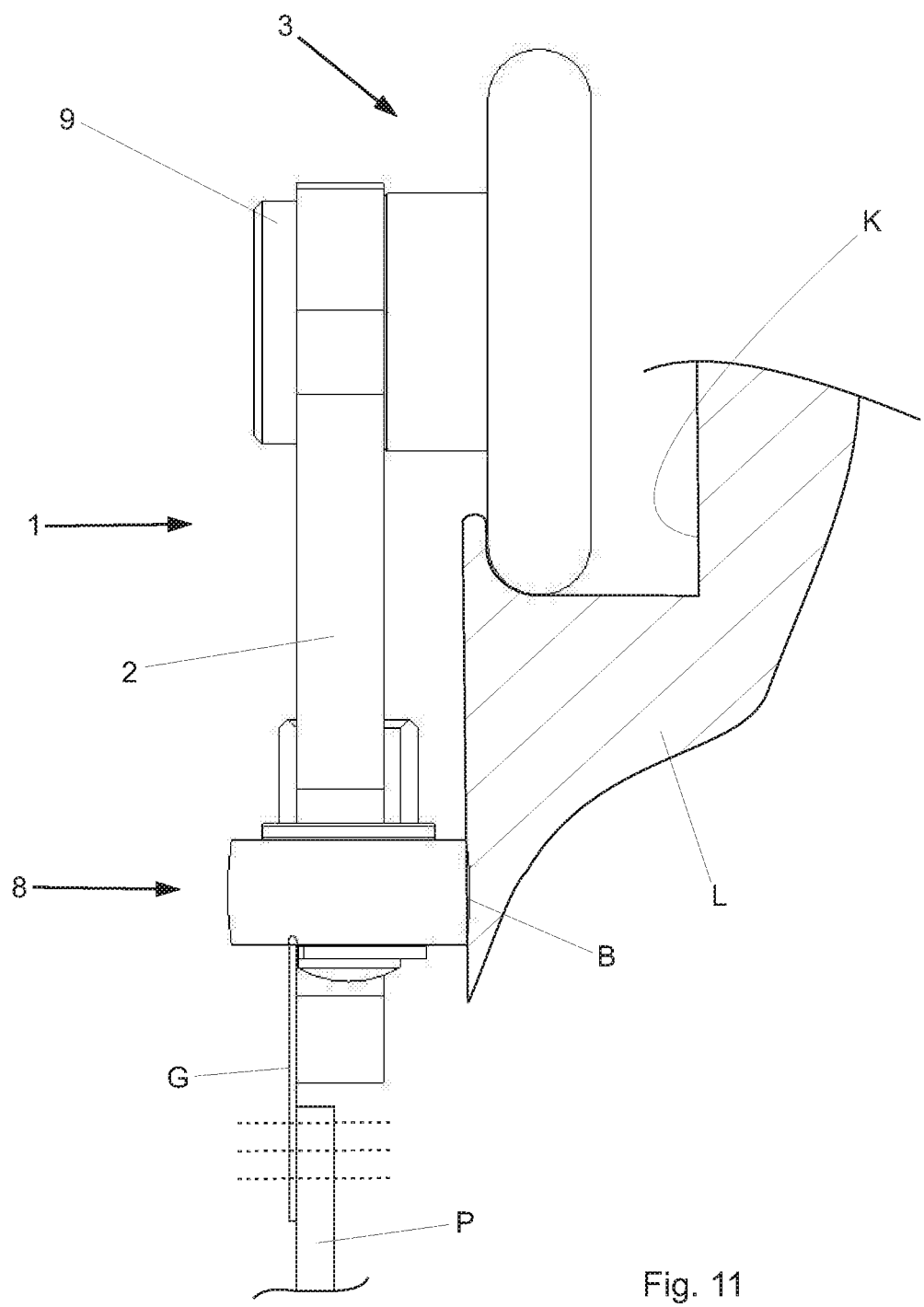
FIG. 11 shows a cross-section through a longitudinal carrier of the tarpaulin structure from FIG. 10 with a tarpaulin suspension device and the upper end of a tarpaulin.

It can be seen in FIG. 11 that the guide roller 8 lies against a guide pathway B of the longitudinal carrier L and thereby ensures that even when the tarpaulin P has been loosened, the tarpaulin suspension device 1 does not drag on the longitudinal carrier L. In this manner, the tarpaulin P is also not rubbed against the longitudinal carrier L. Furthermore, the belt G can be seen, which connects the side tarpaulin P with the tarpaulin suspension device 1. If the tarpaulin P is pulled in order to pull it open or closed, the support rollers 3 roll along the bottom of the chamber K, while the guide rollers 8 roll along the outward-facing delimitation B of the longitudinal carrier L.

Figure 12:
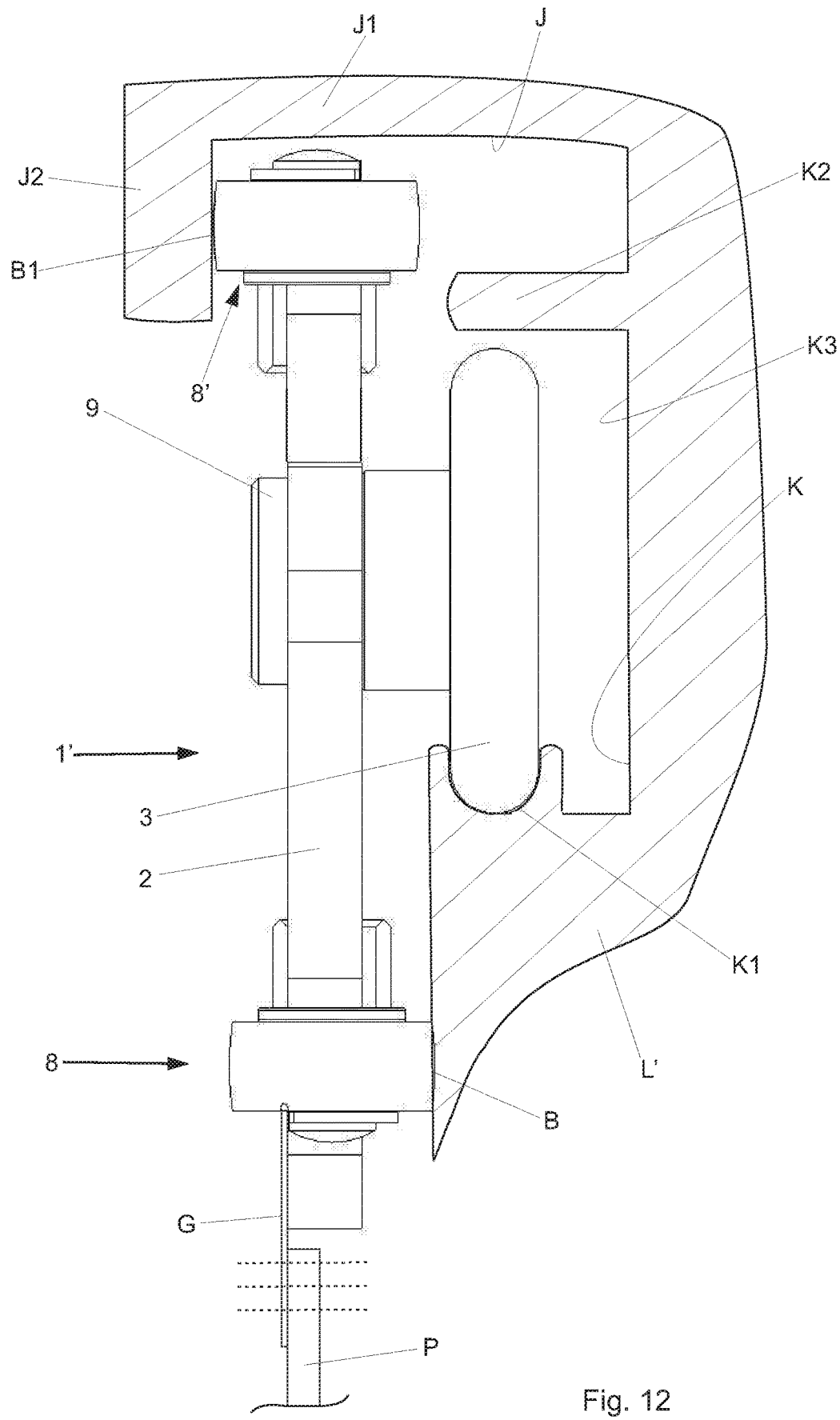
FIG. 12 shows a cross-section through a longitudinal carrier of a tarpaulin structure as in FIG. 10, with another exemplary embodiment of a tarpaulin suspension device.

FIG. 12 shows a further exemplary embodiment of a tarpaulin suspension device 1', in which the same parts or comparable parts as in the preceding exemplary embodiment are referred to with the same reference symbols, so that here, only the differences will be discussed.

It can be seen that the longitudinal carrier 11' has a modified configuration, in which the support roller 3 is guided in a track K1 provided in the chamber K, which track supports the support roller 3 on both sides. The chamber K has an outward-directed shank K2, which is disposed above the guide roller 3 and prevents lifting of the tarpaulin suspension device 1' out of the track K1. It can be seen that the outward-directed surface K3 of the chamber K, which connects the track K1 and the shank K2, is at a distance from the support rollers 3, so that the tarpaulin suspension device 1' can be pivoted within the track K1. For this purpose, it is possible to structure the lateral delimitations of the track K1 to be slightly lower, in order to facilitate the pivot movement, or to eliminate one of the two delimitations, as is the case for the longitudinal carrier L in FIG. 11.

The longitudinal carrier L' has a further chamber J, the upper crosspiece J1 of which chamber projects beyond the tarpaulin suspension device 1' and from which chamber a region J2 that is folded downward projects, which region makes a further guide pathway B1 available.

A further guide roller 8' is connected at the upper edge of the base plate 2, comparable to the guide roller 8, wherein a further guide roller 8' is provided, in each instance, opposite the guide roller 8, wherein the outside circumference of the further guide roller 8' rolls on the guide pathway B1, in each instance. In this way, an additional support is created, which relieves stress on the guide roller 8 and therefore guarantees an increased useful lifetime of the tarpaulin suspension device 1'. In this regard, the further guide rollers 8' are connected with the base plate 2 in the same manner as the guide rollers 8.

Figure 13:
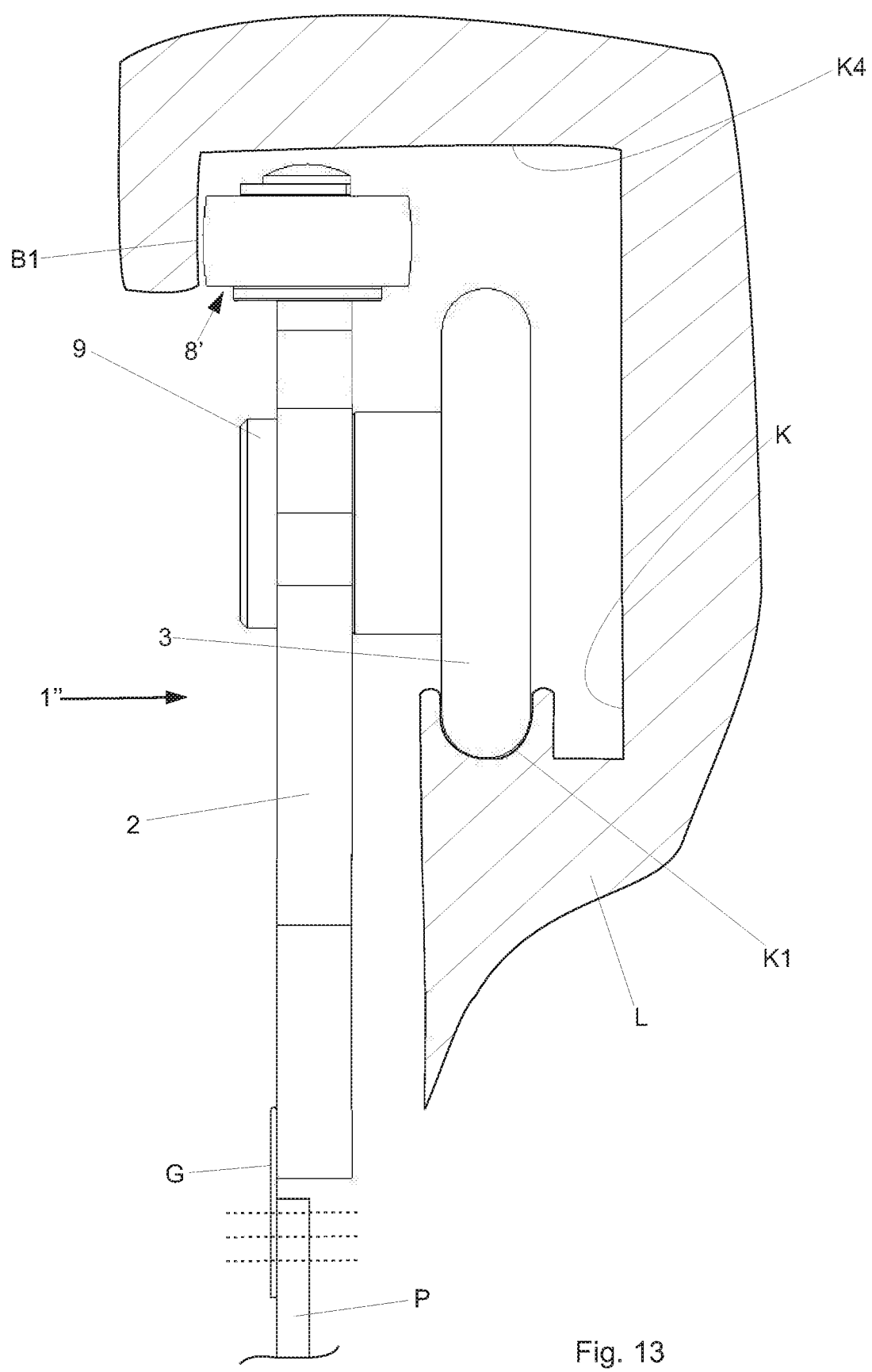
FIG. 13 shows a cross-section through a longitudinal carrier of a tarpaulin structure as in FIG. 10, with yet another exemplary embodiment of a tarpaulin suspension device.

FIG. 13 shows a further exemplary embodiment of a tarpaulin suspension device 1", in which the same reference symbols show the same or structurally comparable parts as in the exemplary embodiment according to FIG. 12.

The geometry of the longitudinal carrier L" from FIG. 13 is modified, in this regard, since the further guide roller 8' and the support roller 3 run in the same chamber K, in other words the crosspiece K2 from FIG. 12 is omitted, so that in total, a more compact, lower construction height of the chamber K is achieved. The support roller 3 is once again guided in a track K1, while the outside circumference of the guide roller 8' rolls on the guide pathway B1 of the chamber K. In this regard, the height of the chamber K is dimensioned in such a manner that the tarpaulin suspension device 1" can pivot in the track K1, but cannot be lifted out upward; for this purpose, the underside of the shank K4 is dimensioned to be so low that the upper end of the guide roller 8' or of its bearing journal prevents the tarpaulin suspension device 1" from being lifted out. It can be seen that the tarpaulin P can also be connected with the base plate 2 significantly closer to the support rollers 3, so that a very compact and space-saving tarpaulin suspension device 1" is created. Since no guide roller is connected at the lower edge of the base plate 2, the guide rollers 8' are the only guide rollers.

A further particularity of the exemplary embodiment according to FIG. 13 consists in that the guide roller 8' is mounted on a journal formed in one piece and in one part with the base plate 2, projecting from the edge of the base plate 2, which journal was rounded off before the actual roller was set on. As a result, it is not necessary to insert or drive or weld a separate bolt into a recess of the base plate 2, so that production is simplified and the stability of the tarpaulin suspension device 1" is increased.

Figure 14:
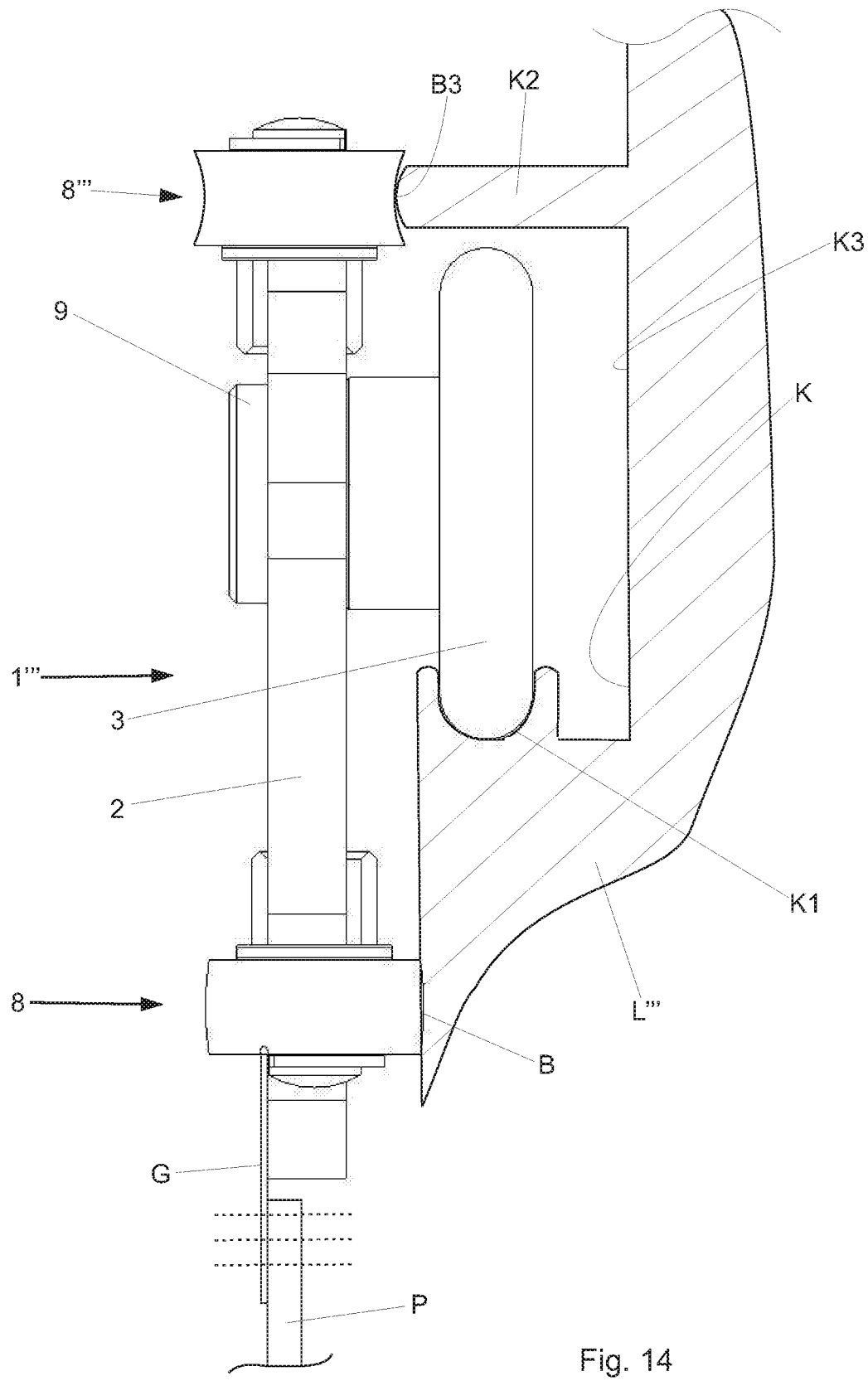
FIG. 14 shows a cross-section through a longitudinal carrier of a tarpaulin structure as in FIG. 10, with yet another exemplary embodiment of a tarpaulin suspension device.

FIG. 14 shows a further exemplary embodiment of a tarpaulin suspension device 1''', which can be displaced in a longitudinal carrier L''', in which the same structurally comparable parts as in FIG. 11 are explained with the same reference signs.

It can be seen that the tarpaulin suspension device 1''' has a very compact structure. The particularity of the tarpaulin suspension device 1''' consists in that the further guide roller 8''' has a concave outside circumference, as shown in FIG. 14, which makes it possible that the further guide roller 8''' can support itself on the outward-facing edge of the shank K2, which edge forms a guide pathway B3. As a result, the guide roller 8 is relieved of stress, wherein here, too, the further guide roller 8''' is connected with the base plate 2 opposite each of the two guide rollers 8, in each instance.

Figure 15:
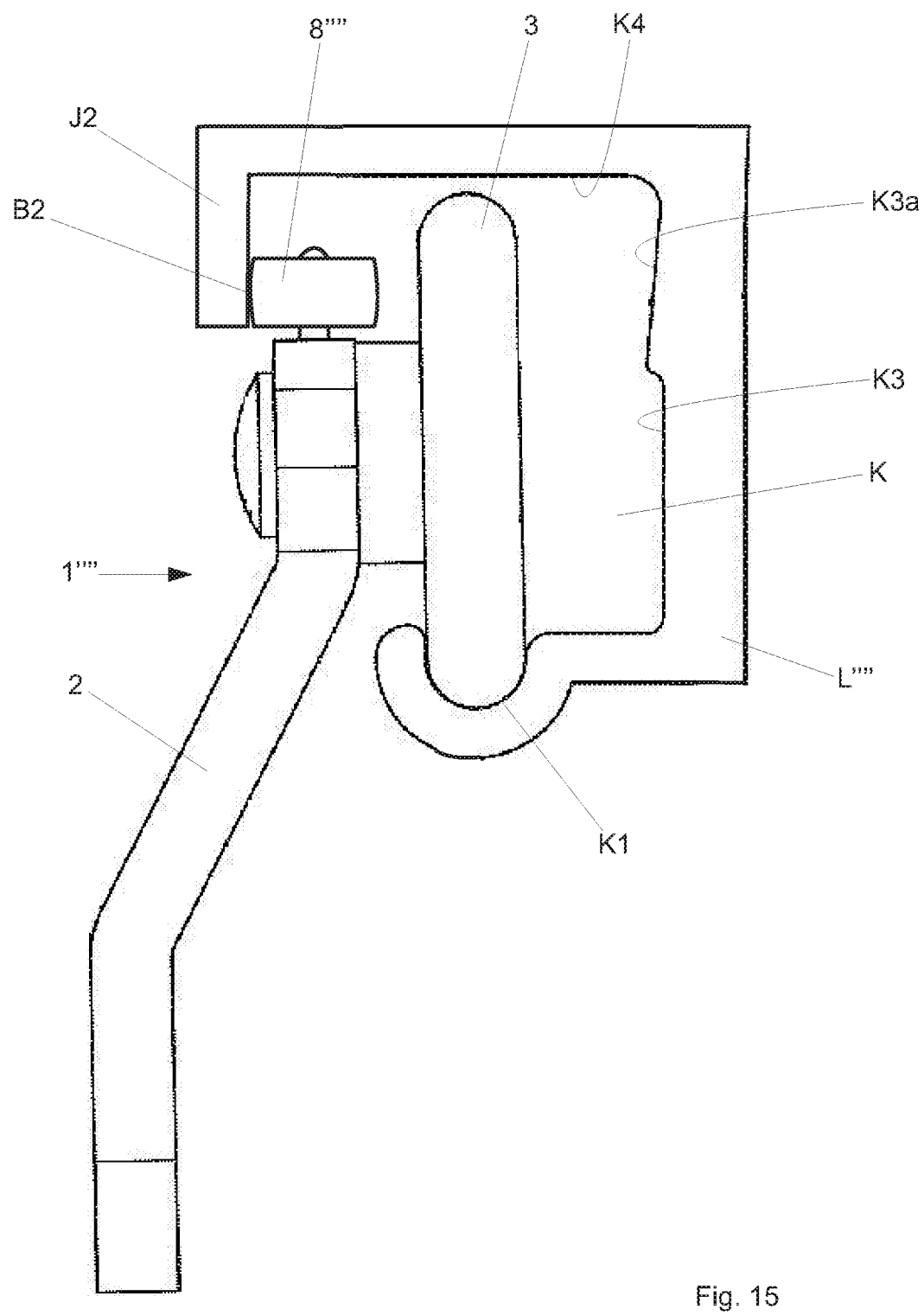
FIG. 15 shows a cross-section through a longitudinal carrier of a tarpaulin structure as in FIG. 10, with yet another exemplary embodiment of a tarpaulin suspension device.

FIG. 15 shows a further exemplary embodiment of a tarpaulin suspension device 1'''', in which the same reference symbols as in FIG. 13 describe the same or structurally comparable parts.

It can be seen that the guide roller 8'''' is guided in a modified profile of a longitudinal carrier L'''', which has only one chamber K with a track K1, wherein the base plate 2 has a guide roller 8'''' above the plane of the connection of the support rollers 3, which guide roller is disposed approximately centered between the two support rollers 3 and is dimensioned to be quite small, so that it can be disposed so low down that it projects beyond the plane in which the support rollers 3 lie, above the upper edge of the base plate 2. In this regard, the circumference of the guide roller 8'''' rolls against the guide pathway B2, which rolls on a shank J2 of the chamber K.

It can be seen that the tarpaulin suspension device 1'''' can pivot well in the track K1 with its support rollers 3, wherein the guide roller 8'''' allows the side tarpaulin to pivot outward due to its contact with the guide pathway B2, but does not allow the tarpaulin to pivot inward. It can furthermore be seen that a section K3a is provided on the outward-facing surface of the chamber K, against which the support rollers 3 make contact in the event of pivoting, so that the maximal angle is advantageously restricted as a result. It can furthermore be seen that the shank K4 prevents the tarpaulin suspension device 1'''' from being lifted out, wherein here, the support rollers 3 make it impossible for it to be lifted out upward.

The particularity in the exemplary embodiment according to FIG. 15 consists in that only one guide roller 8'''' is connected with the tarpaulin suspension device 1'''', since the support rollers 3 are already supported laterally slightly farther away by the track K1, and therefore the moments that occur are slight.

The invention has been explained above using exemplary embodiments in which the guide roller is structured with a perforated disk 8k composed of plastic as the rolling element or as the rotating part of the guide roller 8. It has to be understood that a perforated disk made of metal can also be provided, wherein then, it is expedient if a bushing improves the friction properties on bolt 8b and disk 8s. Such a bushing can be formed from Teflon, for example, in the manner of a collar bushing.

The invention has been explained above using an exemplary embodiment in which the base plate is produced from steel. It has to be understood that the base plate can also be produced from other alloys or materials, in particular from plastic or a metal/plastic composite. If the base plate is formed from a plastic, which can also be reinforced with glass fibers or aramid fibers, it is easily possible to provide the grooves 2n, into which the bearing journal 8z of the roller 8 is worked, without performing any cutting work. Likewise, it is then possible to already produce the bearing journal 8z in one piece with the base plate 2, so that only the perforated disk 8k has to be applied and secured. It is even possible to already produce the perforated disk 8k in one piece during the production from plastic.

The invention has been explained above using an exemplary embodiment in which the guide rollers 8 are disposed in a plane perpendicular to the support rollers 3 and in a plane perpendicular to the extension of the base plate 2, but at least of its upper section 2o. It has to be understood that the guide rollers 8 can also assume an angle relative to this, in order to balance out elastic deformation, in particular when the tarpaulin P is opened and closed.

The invention has been explained above using an exemplary embodiment in which a guide roller 8 is provided in the two corners 2e of the base plate 2, in each instance. It has to be understood that only one guide roller 8 can also be provided on the base plate 2, or alternatively, that a guide roller 8 can be disposed in only one of the two corners 2e. Furthermore, it is possible to provide further guide rollers aside from the two guide rollers 8, if, for example, further guide surfaces of the longitudinal carrier L allow support.

The invention has been explained above using an exemplary embodiment in which the bearing journal 8z of the guide roller 8 is mounted in a groove 2n of the base plate 2 on one side. It has to be understood that it is also possible to mount the guide roller 8 on both sides, namely in that the bolt 8b is lengthened and fixed in place in an opposite region of the base plate 2. In this case, however, the plastic disk 8k cannot easily be replaced.

The invention has been explained above using exemplary embodiments in which the circumference of the plastic perforated disk 8 does not project beyond the face-side delimitation of the base plate 2 in the displacement direction, so that when the side tarpaulin P has been pushed together and laid in folds, the metallic face sides of the base plate 2 reciprocally transfer the tension forces and shear forces of the tarpaulin suspension device 1, 1'. However, it is also possible that the guide roller 8 projects not just beyond the two flat sides 2v, 2h of the base plate 2, but also beyond the edge of the base plate 2 on the face side.

The invention has been explained above using an exemplary embodiment in which the guide rollers 8 are disposed approximately flush with the extension of the oblong hole 4. The precise positioning of the plane of the guide rollers 8 or of the plastic perforated disk 8k results from the position of the related guide surface on the longitudinal carrier L. It is possible to also dispose the guide rollers 8 farther down, with reference to the oblong hole 4, in other words below the oblong hole 4 or also below the corner 2e, with is then not left out or not left out entirely.

The invention has been explained above using an exemplary embodiment in which the bearing axle 8b of the guide rollers 8 is disposed on the base plate 2 farther outward, in each instance, than the outermost point of the support rollers 3, which is defined by the maximal radius of the raceway 3k made of plastic. It is understood that the guide rollers 8 can also be disposed below the support rollers 3.

The invention has been explained above using exemplary embodiments in which mirror symmetry exists with reference to the plane E. It has to be understood that the tarpaulin suspension device can also be structured as an asymmetrical part.

The invention has been explained above using exemplary embodiments in which the support rollers are screwed onto the base plate. It has to be understood that the support rollers can also be connected with or screwed onto the base plate 2 in some other manner, but in particular, also riveted.

The invention has been explained above using exemplary embodiments in which the guide roller 8 is inserted into a groove 2n of the base plate. It is understood that the guide roller 8 can also be disposed on a projection that projects away from the lower edge or the lower narrow side 2s of the base plate 2, if the projecting section is sufficiently rounded off to mount the plastic perforated disk 8k so as to rotate. Alternatively, instead of rounding off, a round bearing having a polygonal hole can be affixed to the above section. Furthermore, it is possible to provide a bore in the narrow side 2s instead of the groove 2n, into which bore a bolt is inserted, which either forms the bearing journal 8b or allows a rotating movement in the bore, and thereby the roller 8k is held so as to rotate with reference to the base plate 2.

The invention has been described above using exemplary embodiments in which the journal that supports the guide roller is disposed essentially in the plane of or as an extension of the base plate 2. It has to be understood that the bearing journal can also enclose an angle with regard to the plane of the base plate. In particular, the angle can also amount to as much as 135° and, in particular, 90°. If the bearing journal is configured out of the base plate itself, it can be bent away—also before or after rounding. As a result, it is also possible, for example, to punch a journal out of the base plate and then to bend it in perpendicular manner, with the result that the support rollers 3 can be connected with this journal.

The invention claimed is:

1. A tarpaulin suspension device comprising a base plate, the base plate defining a front side, a rear side, and an edge surface delimiting the base plate and connecting the front side and the rear side,
    wherein at least one connection device for a tarpaulin and at least two support rollers are disposed on the base plate,
    wherein the support rollers can be displaced along a longitudinal carrier of a cover frame for a tarpaulin structure,
    wherein at least one guide roller is mounted on the base plate,
    wherein the at least one guide roller is perpendicular to the support rollers, and
    wherein the at least one guide roller is mounted in the edge surface of the base plate.

2. The tarpaulin suspension device according to claim 1, wherein the at least one guide roller is mounted on at least one side in the edge of the base plate.

3. The tarpaulin suspension device according to claim 1, wherein the base plate comprises at least one planar section, and wherein the at least one guide roller is arranged in an extension of the at least one planar section.

4. The tarpaulin suspension device according to claim 1, wherein the at least one guide roller is mounted on a side of the base plate that lies opposite the support rollers.

5. The tarpaulin suspension device according to claim 1, wherein the at least one guide roller projects radially on both sides of the base plate.

6. The tarpaulin suspension device according to claim 1, wherein the at least one guide roller is disposed adjacent to the connection device.

7. The tarpaulin suspension device according to claim 1, wherein the at least one guide roller is disposed in a downward-facing end of the base plate.

8. The tarpaulin suspension device according to claim 1, wherein the at least one guide roller is disposed perpendicular to a plane of the support rollers, and wherein the at least one guide roller is disposed perpendicular to a plane of the base plate.

9. The tarpaulin suspension device according to claim 1, wherein the base plate has a recess in which the at least one guide roller is disposed.

10. The tarpaulin suspension device according to claim 9, wherein the recess is provided in a corner of the base plate.

11. The tarpaulin suspension device according to claim 1, wherein the at least one guide roller is mounted on a bearing journal protruding from the base plate.

12. The tarpaulin suspension device according to claim 1, wherein at least a second guide roller is disposed on the base plate.

13. The tarpaulin suspension device according to claim 1, wherein the support rollers are connected with the base plate by way of a roller bearing having an inner bearing ring and an outer bearing ring, wherein the inner bearing ring has a hollow-cylindrical section that projects axially beyond the outer bearing ring, and wherein the inner bearing ring forms a spacer section relative to the base plate.

14. A tarpaulin suspension device comprising a base plate,
wherein the base plate comprises two substantially planar surfaces and an edge connecting the two substantially planar surfaces,
wherein the edge is substantially perpendicular to the two surfaces,
wherein a first support roller and a second support roller are disposed on one of the surfaces,
wherein a hole for connecting the base plate to a tarpaulin is provided in the base plate,
wherein a first guide roller and a second guide roller are mounted on the base plate,
wherein the guide rollers are oriented perpendicular to the support rollers, and
wherein the first guide roller and the second guide roller are mounted in the edge of the base plate.

15. The tarpaulin suspension device according to claim 14, wherein the base plate comprises a first planar section and a second planar section that are disposed at an angle relative to one another.

16. The tarpaulin suspension device according to claim 14, wherein each of the support rollers are connected with the base plate by way of a roller bearing having an inner bearing ring and an outer bearing ring, wherein the inner bearing ring has a hollow-cylindrical section that projects axially beyond the outer bearing ring, wherein the inner bearing ring forms a spacer section relative to the base plate, and wherein the spacer section has a face side that is supported on one surface of the base plate.

17. The tarpaulin suspension device according to claim 14, wherein the guide rollers project radially on both surfaces of the base plate.

18. The tarpaulin suspension device according to claim 14, wherein the base plate comprises a first recess and a second recess each provided in a lower corner of the base plate, wherein the first guide roller is disposed in the first recess, and wherein the second guide roller is disposed in the second recess.

19. The tarpaulin suspension device according to claim 14, wherein a bearing journal protrudes from the base plate and defines an axis of one of the first guide roller and the second guide roller.

20. A tarpaulin suspension device for being displaced along a longitudinal carrier of a tarpaulin structure and comprising a base plate,
wherein the base plate comprises two substantially planar surfaces,
wherein the base plate comprises a narrow edge connecting the two surfaces,
wherein a first support roller and a second support roller are disposed on one of the surfaces,
wherein a connecting hole is provided in the base plate,
wherein at least a first guide roller is mounted on the base plate,
wherein the first guide roller is oriented at an angular offset from the support rollers, and
wherein the first guide roller is rotatable about a bearing journal protruding from the edge of the base plate.

* * * * *